United States Patent
Kuslak et al.

(10) Patent No.: US 7,389,407 B1
(45) Date of Patent: Jun. 17, 2008

(54) CENTRAL CONTROL SYSTEM AND METHOD FOR USING STATE INFORMATION TO MODEL INFLIGHT PIPELINED INSTRUCTIONS

(75) Inventors: John S. Kuslak, Blaine, MN (US); Thomas D. Hartnett, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 1049 days.

(21) Appl. No.: 10/278,559

(22) Filed: Oct. 23, 2002

(51) Int. Cl.
*G06F 15/00* (2006.01)

(52) U.S. Cl. .................... 712/244; 712/232; 712/245

(58) Field of Classification Search ............ 712/232, 712/244, 245
See application file for complete search history.

(56) References Cited

U.S. PATENT DOCUMENTS 5,577,259 A * 11/1996 Alferness et al. ............ 712/41
6,446,029 B1 * 9/2002 Davidson et al. ........... 702/186

* cited by examiner

*Primary Examiner*—Tonia L. M. Dollinger
(74) *Attorney, Agent, or Firm*—Charles A. Johnson; Robert Marley; Beth L. McMahon

(57) ABSTRACT

A method and apparatus to control logic sections of a pipeline instruction processor is disclosed. A state machine is provided that models the flow of instructions through the pipeline. The state machine is capable of modeling execution for all combinations of instruction types that may be present within the pipeline at a given time. The state machine also models various events that affect the way instruction execution is overlapped within the pipeline, and other system occurrences that may cause the termination of some processing activity within the pipeline. The state machine provides signals to control the various logic sections. These signals may be used to determine whether the results of processing activity within the logic sections should be retained or discarded.

23 Claims, 21 Drawing Sheets

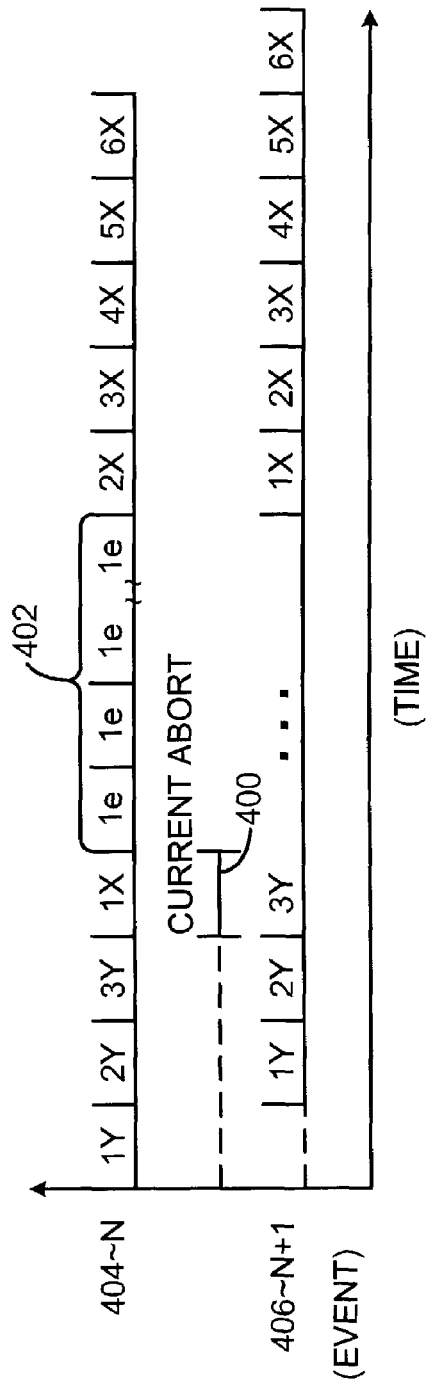
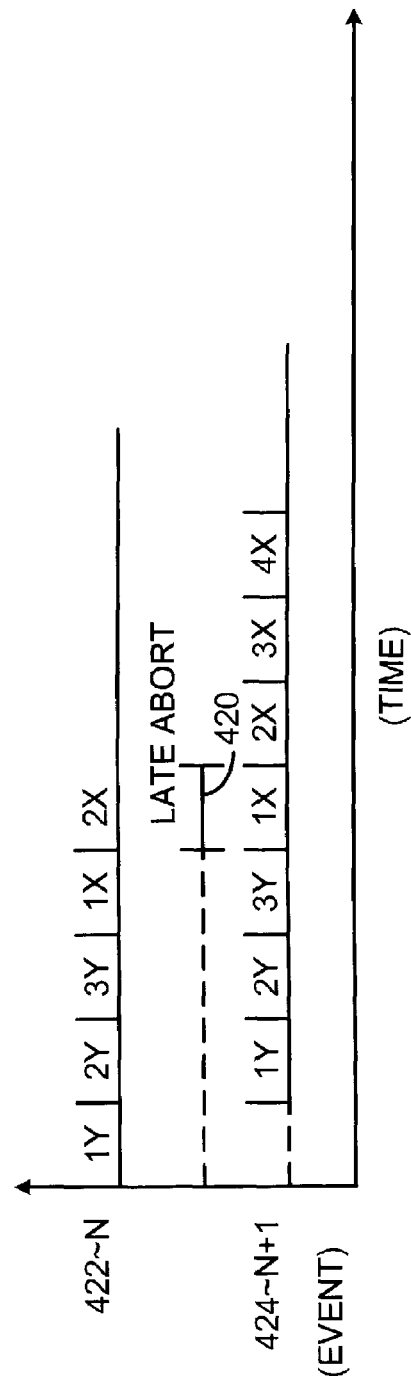

CENTRAL CONTROL SYSTEM AND METHOD FOR USING STATE INFORMATION TO MODEL INFLIGHT PIPELINED INSTRUCTIONS

FIELD OF THE INVENTION

The current invention relates generally to instruction processing within a data processing system; and more particularly, relates to an improved system and method for controlling the pipeline of an instruction processor.

DESCRIPTION OF THE RELATED ART

Modern data processing systems include an Instruction Processor (IP) that comprises one or more functional units that perform various tasks. The functional units may include, for example, a decoder, an instruction cache, an operand cache, an arithmetic unit, and address generation logic.

An IP is designed to execute machine instructions. These instructions direct one or more of the functional units to perform specific operations on data. These operations may include loading data from memory, storing data to memory, performing arithmetic operations, generating addresses, and the like. Execution of each instruction typically requires a number of data processing operations and involves multiple functional units within the processor.

Early data processors executed only one instruction at a time. Each instruction was executed to completion before execution of a subsequent instruction was initiated. The instruction execution could be divided into discrete tasks or steps, with each step being executed by one or more of the functional unit within the machine. In this type of system, each functional unit may be busy during only one step of instruction execution, and idle during the other steps. Thus, the serial execution of instructions does not fully utilize the functional units within an IP.

Many mechanisms have been developed to improve the performance of earlier data processing systems. One technique involves the use of pipelined architectures. Pipelined architectures attempt to keep all the functional units of a processor busy at all times by overlapping execution of several instructions. Pipelined designs increase the rate at which instructions can be executed by allowing a new instruction to begin execution before a previous instruction is finished executing.

Pipelined architectures are more difficult to control than their less complex predecessors. This is particularly true when some type of event within the IP alters the flow of instructions through the pipeline. For example, assume a conditional skip instruction is being executed by the IP. This type of instruction will cause the next instruction within the instruction stream to be "skipped" if a particular condition is detected while the skip instruction is being execution. In a pipelined architecture, however, this next instruction is already being executed by the time the skip condition becomes valid. In this case, all functional units involved in the execution of the subsequent instruction must be able to "undo" the effects of that execution, and return to the state they were in before execution of the next instruction commenced.

Many other types of system occurrences may necessitate nullifying the results of one or more instructions that have already started execution within the pipeline. These types of events include jump operations, interrupts, errors, and conflict situations that arise because two consecutive instructions within the instruction stream require use of a same system resource at the same time. In response to any of these situations, it is often necessary to selectively terminate some of the processing activities being performed by one or more of the functional units within the IP. Other processing activities must be allowed to complete unaffected.

Controlling a pipeline to handle the types of occurrences described above can be an extremely difficult task for a number of reasons. First, instructions do not necessarily begin execution in a predictable manner. For example, if a cache miss occurs during the retrieval of an instruction from an instruction cache, the overlapped manner in which instruction execution typically occurs within the pipeline is disrupted. This type of disruption may also occur when a conflict causes a delay in the execution of an instruction. Thus, the way in which the instructions enter and proceed through the pipeline must be tracked so that appropriate processing activity may be voided, if necessary.

Variations associated with the execution of certain instructions also complicate pipeline control. For example, some instructions require additional instruction cycles to execute. Execution of other instructions requires the use of specialized control sections within the IP. The types of instructions present within the pipeline at a given time must be tracked to ensure that appropriate control is maintained over the pipeline. The foregoing issues become even more challenging as the depth of the pipeline is increases to accommodate the parallel execution of more instructions.

In prior art systems, pipeline control is not centralized. Instead, each functional unit is responsible for managing the processing activities that are initiated within that unit. This involves addressing the design challenges discussed above, including tracking the number of, and types of, instructions that are resident within the pipeline at a given time. This further involves detecting the occurrence of any of the events that would necessitate voiding processing activities, and then determining which processing activities must be voided. In short, each functional unit must track all pipeline activity and the various events that affect that activity, then take appropriate actions, as needed, to nullify previously initiated activity.

According to the prior art methodology, pipeline control is dispersed throughout the system, and is implemented in a non-uniform manner. This is particularly true because each functional unit is generally designed by a different logic designer, and is therefore implemented without the need to consider how control issues are solved within another functional unit. This results in the duplication of design effort, greatly increases the amount of circuitry needed to implement the IP, and significantly increases the amount of time to design and debug the system.

What is needed, therefore, is an improved pipeline control system that addresses the foregoing problems.

SUMMARY OF THE INVENTION

The present invention overcomes the disadvantages found in the prior art by providing a method and apparatus to control all functional units of an IP using a centralized approach. According to one aspect of the invention, a central state machine is provided that models the flow of instructions through the pipeline. The state machine is capable of modeling execution for all combinations of instructions that may be present within the pipeline at a given time. The state machine also models various events that affect the way instruction execution is overlapped within the pipeline, including the occurrence of cache miss situations.

In one embodiment, the state machine includes multiple timing chains. As each instruction enters the pipeline, one or more of the timing chains are activated to represent the processing activities initiated by that instruction. As execution for a given instruction progresses, state devices included within the one or more timing chains are set or cleared to represent the flow of the instruction through the pipeline. The state machine thereby tracks the way in which instruction execution is overlapped for the various instructions resident in the pipeline at a given moment in time.

The current invention further includes abort logic to track the occurrence of events that may alter the flow of an instruction through the pipeline. These types of events may include, but are not limited to, interrupts, errors, jump and skip instructions, and conflicts. When any of these events occur, the abort logic uses the states included within the state machine, as well as the indication of the event, to alter states within the state machine. In general, this involves modifying states of the state machine to represent the termination of processing activity within the pipeline.

One or more states of the state machine are used to generate control signals. These control signals may be propagated to one or more of the functional areas of the IP to accomplish pipeline control in a centralized and streamlined manner. Specifically, each functional area may use one or more of these control signals to determine whether processing results obtained during the execution of a respective instruction must be retained or discarded. According to one aspect of the invention, each functional area may temporarily stage these processing results in one or more storage devices. The control signals from the state machine may be used to determine whether these staged results may be used to affect pipeline activity.

In one embodiment, the state machine is designed to accommodate different types of instructions that are included within the instruction set of the IP. For example, some special "extended-mode" instructions exert control over the pipeline using microcode data that is read from a microcode RAM. The state machine of the current embodiment provides timing chains to model processing activity initiated by this microcode data.

According to another embodiment of the invention, a pipelined IP is provided that includes multiple functional units, or logic sections, each to perform a respective processing activity. The IP further includes a control circuit coupled to each of the logic sections to model the processing activities within the multiple logic sections, and to thereby determine whether signals generated during predetermined ones of the processing activities must be discarded. The control circuit includes a logic sequencer, and abort logic coupled to alter one or more states existing within the logic sequencer if one or more of the conditions are detected. At least one of the multiple logic sections may include staging circuits to temporarily store the signals generating during predetermined ones of the processing activities, and circuits to receive those ones of the temporarily stored signals that will be used to control future ones of the processing activities, as determined by the control circuit.

In another embodiment, a method for controlling execution of instructions within a pipeline of an instruction processor (IP) is disclosed. The method includes modeling execution of an instruction as it is processed within the pipeline, detecting an event that affects the execution of the instruction, and in response thereto, updating execution modeling. The method further includes using the execution modeling to determine whether the execution of the instruction will be allowed to affect the pipeline.

According to one aspect of the invention, a control system for controlling a pipeline of an instruction processor (IP) is described. The system includes a state machine to record processing activity initiated for each instruction that enters the pipeline, abort logic coupled to the state machine to determine whether any of the processing activity should be terminated, and logic responsively coupled to the state machine to terminate predetermined processing activity.

Another embodiment of the invention provides a method of controlling an IP that has multiple logic sections for performing instruction execution. The method includes executing an instruction within the multiple logic sections, using a circuit to model execution of the instruction within the multiple logic sections, and determining, based on states retained by the circuit, whether one or more signals generated during the execution should be retained. The method further includes detecting an event that affects execution of an instruction, modifying the states of the circuit to model the occurrence of the event, and generating one or more signals to terminate execution of the instruction.

Other aspects and embodiments of the invention will become apparent from the following description and the accompanying drawings.

BRIEF DESCRIPTION OF THE DRAWINGS

FIG. 7 is a timing diagram illustrating the activation of a current_abort signal.

FIG. 8 is a timing diagram illustrating activation of a late_abort signal.

DETAILED DESCRIPTION OF THE DRAWINGS

A. System Description

Figure 1:
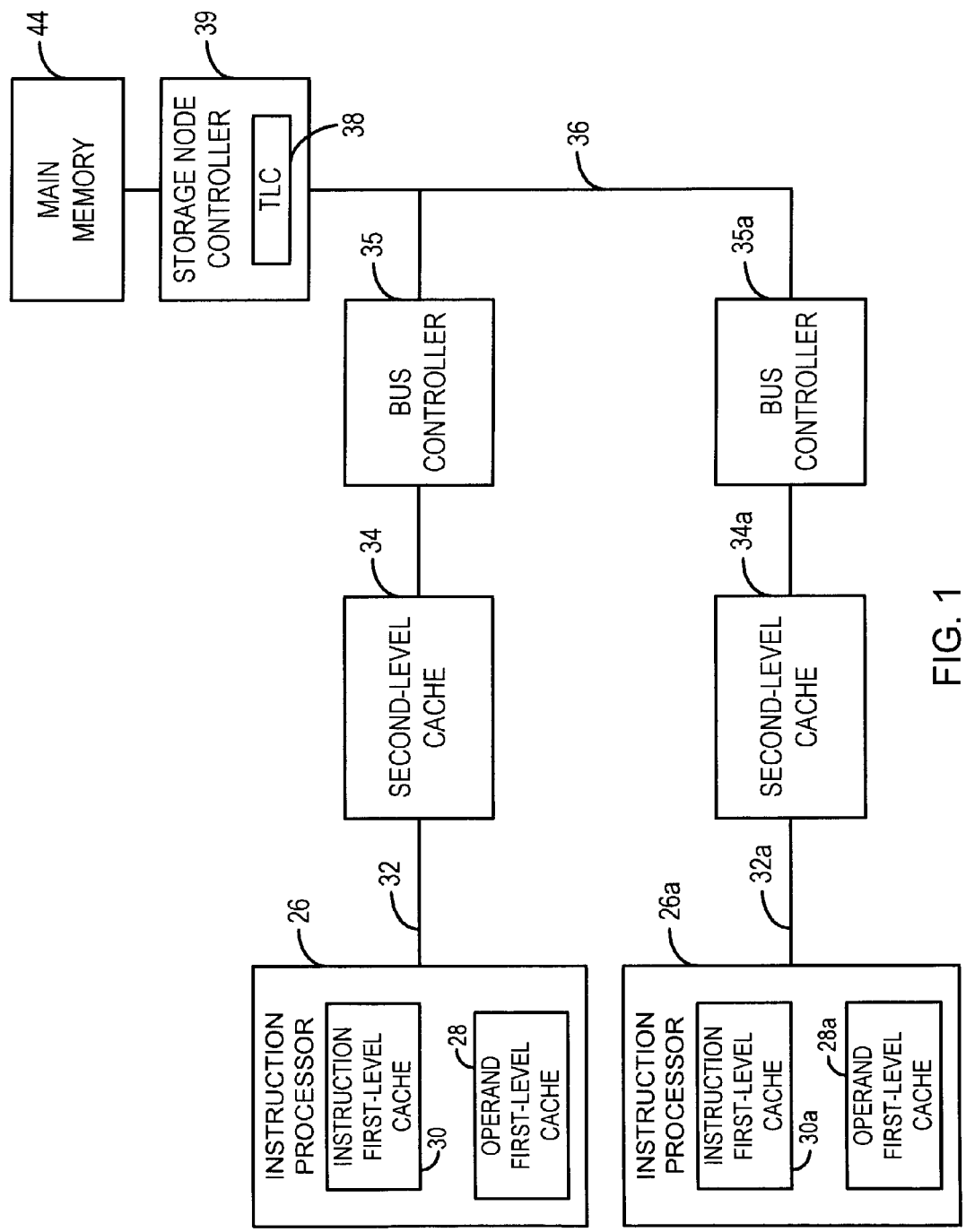
FIG. 1 illustrates one embodiment of a data processing system that may usefully employ the current invention.

FIG. 1 illustrates one embodiment of a data processing system that may usefully employ the current invention. However, many other types of systems may utilize the current invention, as will become apparent to those skilled in the art from the following description and accompanying drawings.

The system of FIG. 1 includes an Instruction Processor (IP) 26 having both an Operand First-Level Cache (O-FLC) 28 and an Instruction First-Level Cache (I-FLC) 30. The O-FLC and I-FLC are relatively small, fast, memories for storing recently used operands and instruction opcodes, respectively to speed instruction execution within the IP as is known in the art.

I-FLC and O-FLC are coupled via Interface 32 to a Second-Level Cache (SLC) 34 storing both instructions and operands. Requests for instructions or operands are made to the SLC when the instructions or operands are not located within the I-FLC 30 or the O-FLC 28, respectively. Similarly, the SLC 34 is coupled via a bus controller 35 to a processor bus 36. Processor bus interfaces to a Storage Node Controller (SNC) 39, which may include a Third Level Cache (TLC) 38. One or more other processors and second-level caches such as IP 26a and SLC 34a may be coupled in a similar manner to processor bus 36. The IPs, SLCs, and SNC 39 that are coupled to given processor bus 36 may be referred to as a "node".

When instructions or operands are not located within SLC 34, a request is driven onto processor bus 36 via bus controller 35. All other SLCs located on the bus are monitoring the bus for such requests. In the current example, if SLC 34a stores a copy of the requested instructions or operands, that copy is driven onto processor bus 36 so that it may be stored within SLC 34. SLC 34a may also have to invalidate its copy, depending on the type of access rights requested by SLC 34. If none of the SLCs on processor bus 36 stores the requested instructions or operands, the request may be fulfilled by SNC 39, which provides a copy of the requested items from TLC 38.

SNC 39 is further coupled to a main memory 44. The main memory, which may be comprised of random-access memory (RAM) and/or any other type of memory known in the art, provides the main storage facility for the system. Additional nodes may be coupled to main memory 44 in a manner similar to that described above for the node including processor bus 36.

When requested instructions or operations are not located in any of the cache memories of a node as discussed above, the requests are forwarded by SNC 39 to main memory 44 for processing. In some cases wherein the system includes multiple processing nodes, main memory may have to obtain the requested items from another processing node. These items are then forwarded to SNC 39, which passes the data to SLC 34 via processor bus 36.

Main memory may be a directory-based system that includes a directory for maintaining data coherency throughout the system. The directory stores information regarding the location of the various instructions and operands within the system. Details associated with one embodiment of a data processing platform having a directory-based coherency system and an architecture similar to that shown in FIG. 1 are described in commonly assigned U.S. patent application Ser. No. 09/001,598 filed Dec. 31, 1997 entitled "Directory Based Cache Coherency System Supporting Multiple Instruction Processor and Input/Output Caches".

Figure 2:
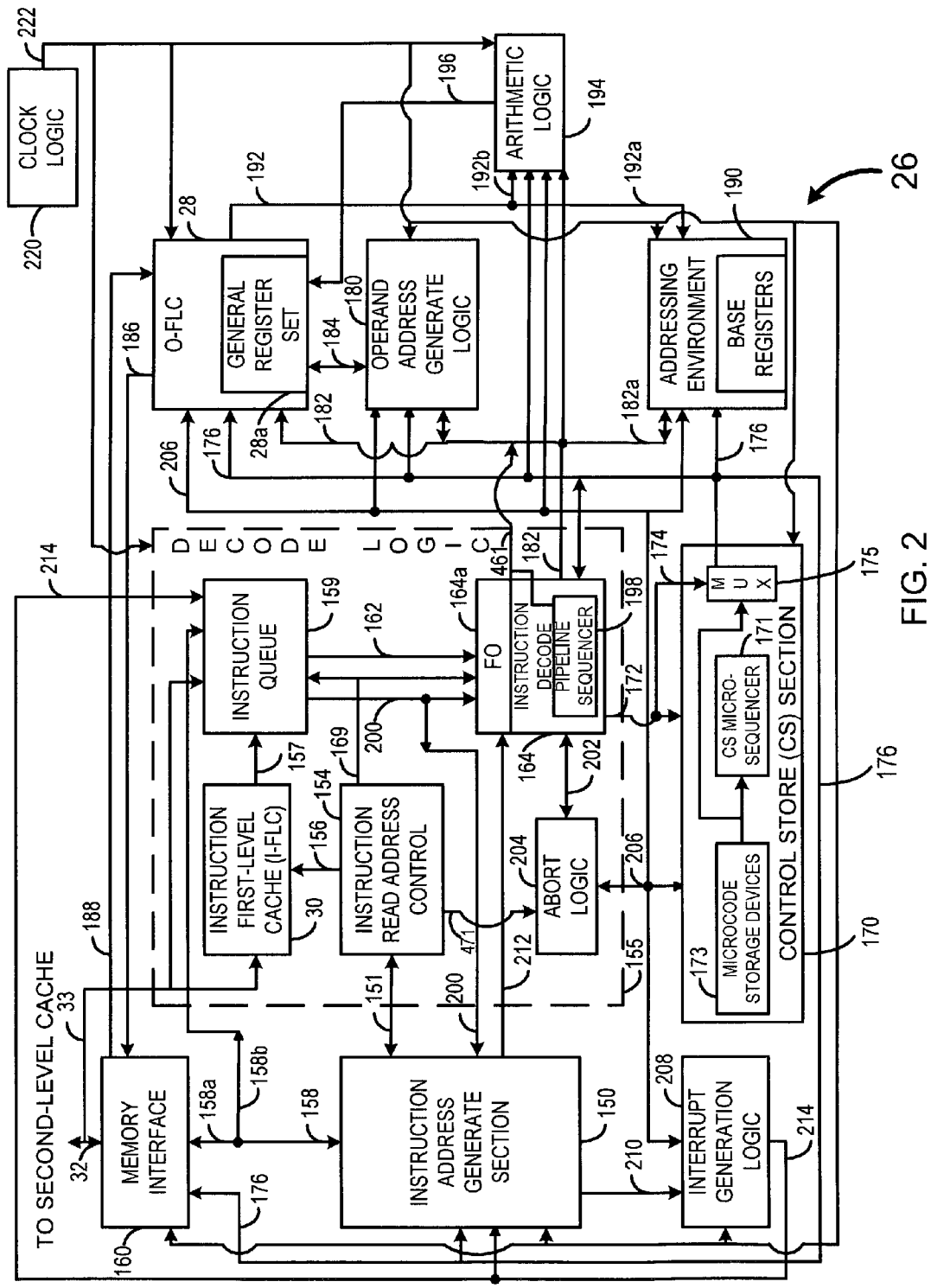
FIG. 2 is a block diagram of one embodiment of an Instruction Processor (IP) that may utilize the current invention.

FIG. 2 is a block diagram of one embodiment of an Instruction Processor (IP) that may utilize the current invention. IP 26 is shown, although it will be understood the following discussion may apply to the other IPs within the system. The illustrated embodiment is exemplary only, and many other types of IP architectures may usefully employ the current inventive system and method.

IP 26 includes an instruction address generate section 150 that generates an absolute address used to retrieve an instruction. This address is provided to the IP Instruction First-Level Cache (I-FLC) 30 via instruction read address control 154, which resides within decode logic 155 (shown dashed). If a cache miss does not occur and the addressed instruction is resident within I-FLC 30, the addressed instruction is transferred to an instruction queue 159 over lines 157. The instruction is staged so that decode may begin.

If a cache miss occurs when attempting to retrieve an instruction from I-FLC 30, the IP suspends pre-fetch instruction execution, meaning that decode operations associated with the current instruction are not initiated. The occurrence of the cache miss is communicated to instruction queue 159 on instruction decode 164 on line 169. Lines 158a communicate the miss to the IP memory interface 160, which initiates a memory request to the SLC 34 across interface 32. When the instruction is returned, it is provided on data path 33 to instruction queue 159 and to the I-FLC 30 to be cached.

Once in the instruction queue 159, the instruction is staged through a series of staging registers (not shown in FIG. 2), and decode is initiated. Partially decoded instruction signals are provided on lines 162 to an instruction decode section 164, and the instruction opcode is loaded into an instruction register referred to as "F0 register" 164a. The instruction decode section 164, which contains both hardware and microcode decode logic, generates control signals to control the rest of the IP. Instruction decode section 164 includes a pipeline sequencer 198, which is a state machine that simplifies and unifies pipeline control according to the current invention. The use of pipeline sequencer 198 is described in detail below.

The control signal generated by instruction decode 164 include addresses provided over lines 182 to an operand address generate logic 180. In response operand address generate logic generates an operand absolute address that is provided to the operand cache (O-FLC) 28 so that an instruction operand may be retrieved.

After the absolute operand address has been received by the O-FLC 28, it is determined whether the addressed operand is resident in the cache. If the operand is not resident, the IP suspends instruction execution and initiates a memory read operation using a real address generated by the O-FLC 28. This real address is transferred over lines 186 to memory interface 160, which then controls the memory request to the SLC 34 over interface 32. After the operand is returned, it is provided to the O-FLC 28 on lines 188.

Operand data is made available over lines 192b to arithmetic section 194 for use in performing binary, floating point, and decimal arithmetic operations. The results of these operations are stored back to a set of storage devices known as the General Register Set (GRS) 28a over lines 196.

Operand data is also made available over lines 192a to addressing environment 190. This logic is responsible for maintaining base addresses that are used to address O-FLC 28 according to the relative addressing scheme employed by the exemplary embodiment.

Also shown in FIG. 2 is control store (CS) section 170, which includes a microsequencer 171 and microcode storage devices 173. During execution of most instructions, CS logic does not exercise control over the other logic sections. Instead, control is provided by instruction decode 164 via signals on lines 182 and 172. The signals on lines 172 are re-driven by CS section 170 onto lines 176. During the execution of some "extended-mode" instruction types, however, CS section 170 generates signals that control a portion of instruction execution. Specifically, when an extended-mode instruction is being executed, signals read by microsequencer 171 from microcode storage devices 173 are driven onto lines 176 to assert control over the other logic sections. The execution of extended-mode instructions is discussed further below. For additional details on a microcode-controlled sequencer for an instruction processor, see commonly assigned U.S. Pat. No. 5,911,083 to Kuslak, incorporated herein by reference.

The processor of FIG. 2 further includes abort logic 204. According to the current invention, abort logic receives signals from instruction decode 164 on lines 202 and further receives signals from all other sections of the logic on an interface shown as lines 206. The received signals include error signals, interrupt and conflict indicators, jump and skip indicators, and other types of signals that indicate the flow of instruction execution is to be re-directed. In response, abort logic 204 generates abort signals that cause the delay, or in some cases, the complete cessation of, instruction execution in a manner to be discussed below.

Finally, the system includes clock logic 220 that distributes clock signals to all of the logic sections of the IP. One of these signals is the cycle clock signal 222 to be discussed further below.

IP 26 is a pipelined instruction processor. As is known in the art, a pipelined instruction processor includes an "instruction pipeline" that is capable of executing multiple instructions at one time, wherein the instructions are each in different states of completion. In the current embodiment, IP 26 is a "six-deep" pipeline, meaning that up to six instructions may be resident within IP 26 at one time, all in different states of completion. This can better be understood by considering FIG. 3.

Figure 3:
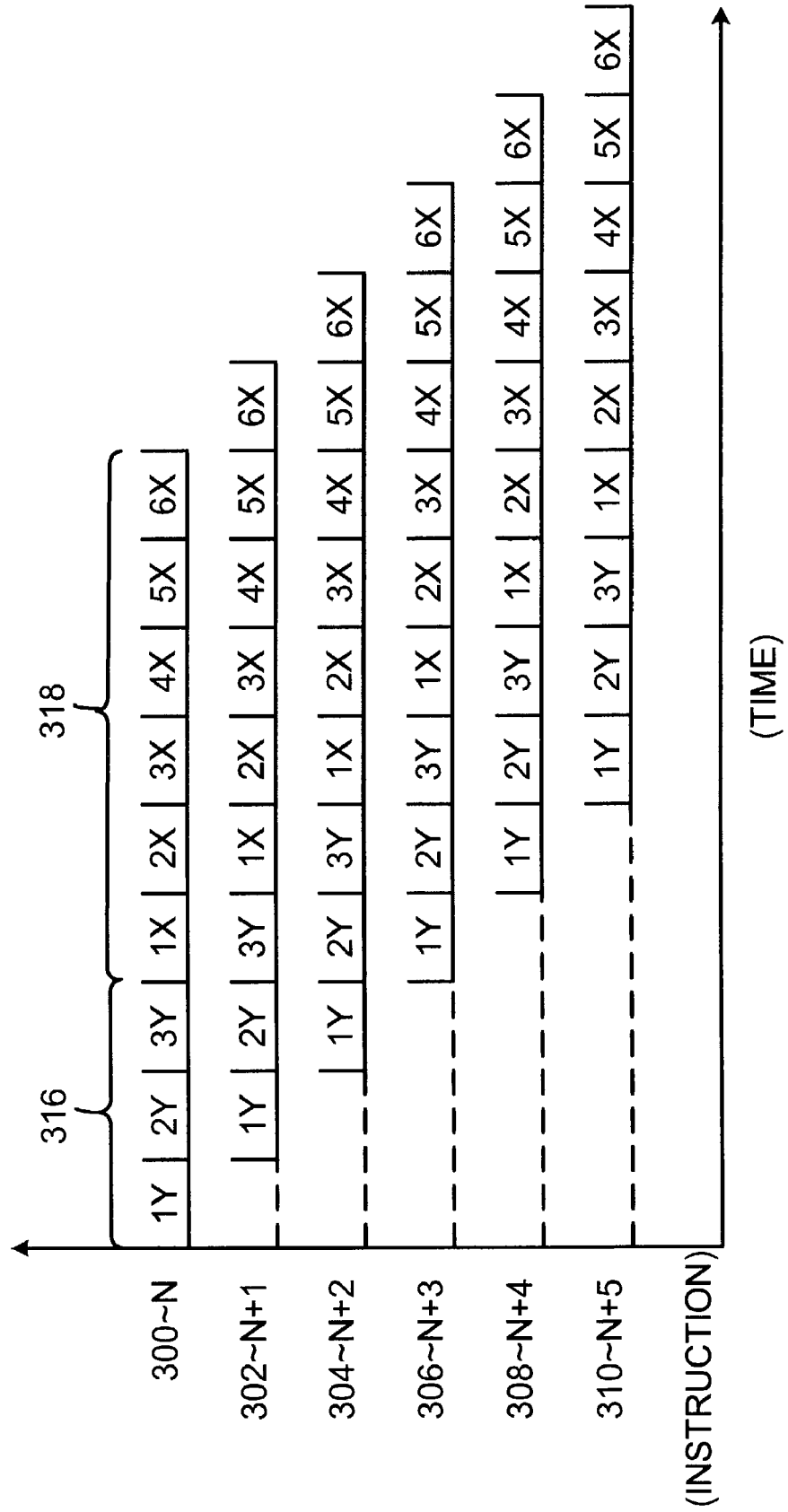
FIG. 3 is a timing diagram illustrating the overlap of instruction execution for six single-cycle instructions.

FIG. 3 is a timing diagram illustrating the overlap of instruction execution for six single-cycle instructions shown as instructions N 300 through N+5 310. The instruction execution is divided into discrete time periods shown as 1Y through 3Y, and 1X through 6X. These time periods are referred to as "cycles". In the current embodiment, a cycle is defined as the time elapsed between the loading of a "Load Register A" instruction into register F0 164a and the loading of the next instruction into register F0. Cycle clock signal 222 discussed above has a period of one cycle. The use of this signal in controlling instruction execution is discussed in detail below.

Cycles 1Y through 3Y, shown as cycles 316 for instruction N 300, are considered pre-execution cycles. These cycles are completed before an instruction is loaded into F0 register 164a, and before most instruction decode operations commence. During these cycles, instruction address generation, instruction pre-fetch, and instruction pre-decode occurs, respectively.

After the pre-execution cycles are completed, each instruction undergoes execution during execution cycles 1X through 6X, shown as cycles 318 for instruction N 300. During each of these cycles, predetermined operations are performed as follows. During the 1X cycle, the instruction opcode is loaded in F0 register 164a and instruction decode 164 begins decoding the instruction. Instruction decode 164 issues operand tag control bits on lines 182 to operand cache 28 so that an operand fetch can be initiated, if necessary. Similarly, instruction decode 164 provides arithmetic logic 194 with a microcode start address, and provides GRS 28a with certain register addresses that may be needed by the instruction. Addressing environment 190 provides any required base addresses to operand address generate logic 180, which, in turn, generates any operand addresses that will be needed to retrieve operands from O-FLC 28.

During the 2X cycle, O-FLC 28 captures any operand addresses from operand address generate logic 180. Additionally, arithmetic logic 194 captures microcode data from its own microcode RAM. This data will be used to control any operation that will be performed during the upcoming cycles.

While the 3X cycle is occurring, O-FLC 28 provides data to the arithmetic logic 194 and/or GRS 28a if a read operation is underway. Within arithmetic logic 194, special "per J" data becomes available to control the completion of any on-going arithmetic operation. If a jump is to take place, a "jump switch" condition becomes active to indicate that execution re-direction is to take place.

Next, the 4X and 5X cycles are executed. These cycles are largely used by arithmetic logic 194 to complete execution of an arithmetic operation. Additionally, during the 5X cycle, a "skip_taken" designator becomes active to indicate that an instruction skip is to be taken to skip an instruction currently executing within the instruction pipeline. Skip operations will be discussed further below.

In the 6X cycle, arithmetic logic 194 stores the results of any arithmetic operations to GRA 28a. Additionally, registers within operand address generate logic 180 and addressing environment 190 may be updated. These registers are employed during O-cache address generation.

It will be understood that the foregoing discussion is not intended to provide a detailed and exhaustive explanation of all the events occurring during the various execution cycles 1X through 6X of the pipeline. Rather it is meant to provide a broad overview of the manner in which instructions are completed as they pass through the functional units of the pipeline. These functional units include the various logic sections of IP 26 shown in FIG. 2.

As is evident from FIG. 3, instruction execution is overlapped for the various instructions resident within the pipeline. For example, when instruction N 300 is beginning execution of 2X cycle, instruction N+1 302 is beginning execution of 1X cycle. Likewise, when instruction N+1 is beginning execution of 2X cycle, instruction N+2 304 is beginning execution of 1X cycle, and so on. For this reason, instructions N through N+5 are each referred to as "single-cycle" instructions, meaning that exactly one cycle elapses between the time the instruction is loaded into F0 register 164a and the time the next instruction in the instruction stream is loaded into F0 register. Not all instructions are single-cycle instructions, as will be evident from the following paragraphs.

Figure 4:
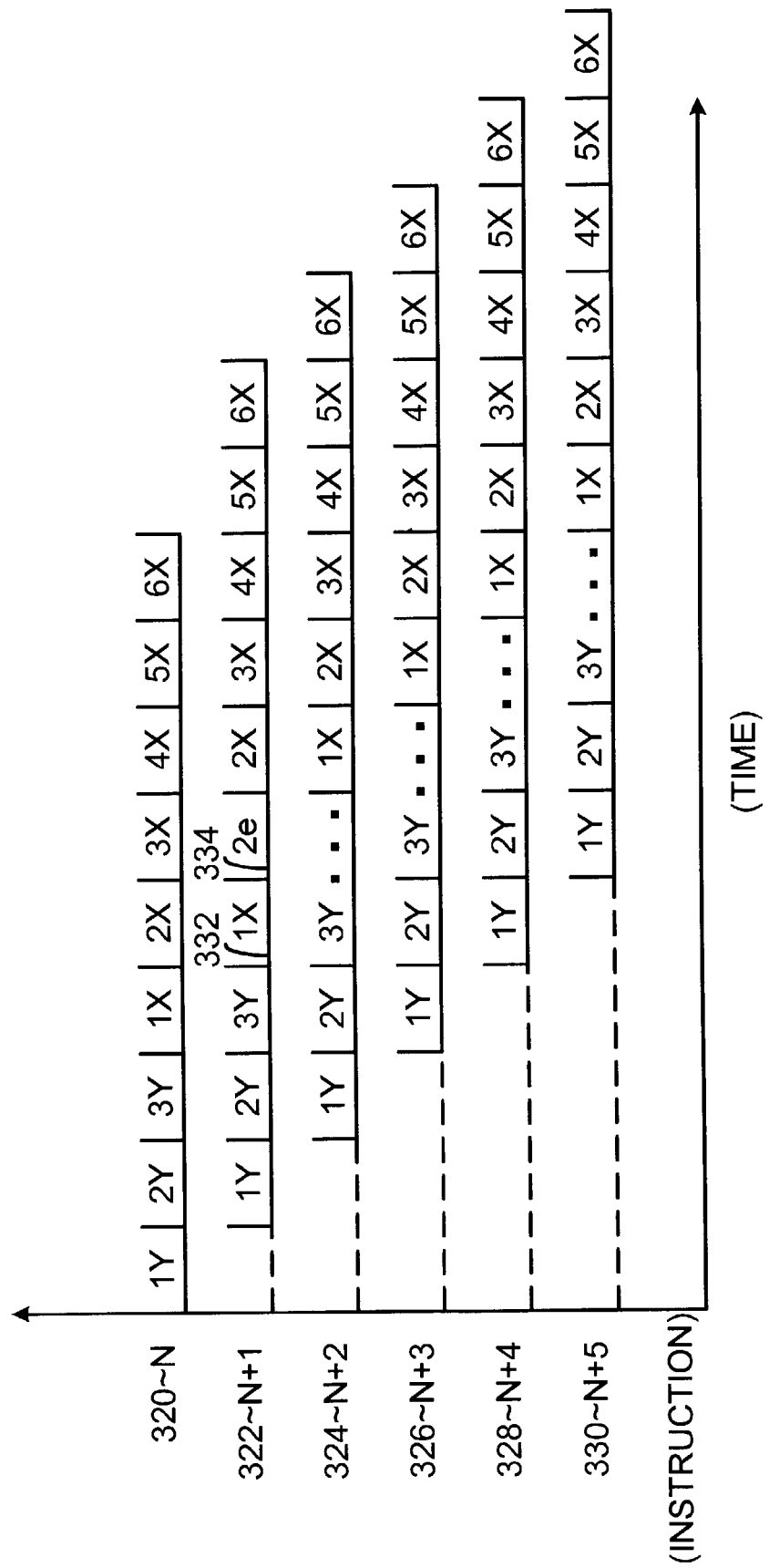
FIG. 4 is a timing diagram illustrating execution of a two-cycle instruction.

FIG. 4 is a timing diagram illustrating execution of a two-cycle instruction N+1 322. All other instructions represented in FIG. 4 are single-cycle instructions. For instruction N+1, two cycles elapse between the time the instruction is loaded into register F0 164a and the time instruction N+2 324 is loaded into register F0. These cycles are shown as 1X cycle 332 and 2e cycle 334 for instruction N+1. The additional 2e cycle is needed because, for two-cycle instructions, two operands must be retrieved from O-FLC 28. Operand address generate logic 180 therefore requires an extra cycle to generate the address that will be needed to retrieve an additional operand. As a result, the 1X cycle for instructions N+2 324 through N+5 330 is delayed one cycle. This is implemented by inserting a cycle between the pre-execution cycle 3Y and the following 1X cycle, thus altering the way in which instructions are overlapped within the instruction pipeline.

For two-cycle instructions, the operations that occur during the various 1X through 6X cycles are similar to those discussed above with respect to FIG. 3. Two-cycle instruction execution is discussed further below.

During execution of single-cycle and two-cycle instruction types, control of the IP is provided by instruction decode 164. Specifically, instruction decode generates control signals which are driven to all logic sections including operand cache 28, operand address generate logic 180, arithmetic logic 194, and addressing environment 190. These control signals control the manner in which processing occurs for the instruction. Some of these signals are provided directly from instruction decode 164 to the various logic sections on lines 182. Other signals are provided indirectly to CS section 170 on lines 172. CS section 170 then selects and re-drives the control signals onto lines 176 to the logic sections of the IP.

As discussed above, in addition to single-cycle and two-cycle instructions, the current embodiment supports a third type of instructions called extended-mode instructions. For these instructions, execution is not controlled exclusively by instruction decode 164. Instead, some control is provided by CS section 170. More specifically, during the execution of extended-mode instructions, microsequencer 171 begins reading microcode instructions from the microcode storage devices 173 using an address supplied by instruction decode on lines 172 (FIG. 2). Some of the bits of the microcode instructions are used as control signals that are selected by select_CS_control signal 174 and multiplexer 175. These signals are driven onto lines 176 to all other logic sections of the IP. Execution by the microsequencer continues for a predetermined number of extended cycles, during which CS section 170 maintains control over instruction execution. Eventually, control is re-assumed by instruction decode so that instruction execution may complete. This will become more apparent from the timing diagram of FIG. 5.

Figure 5:
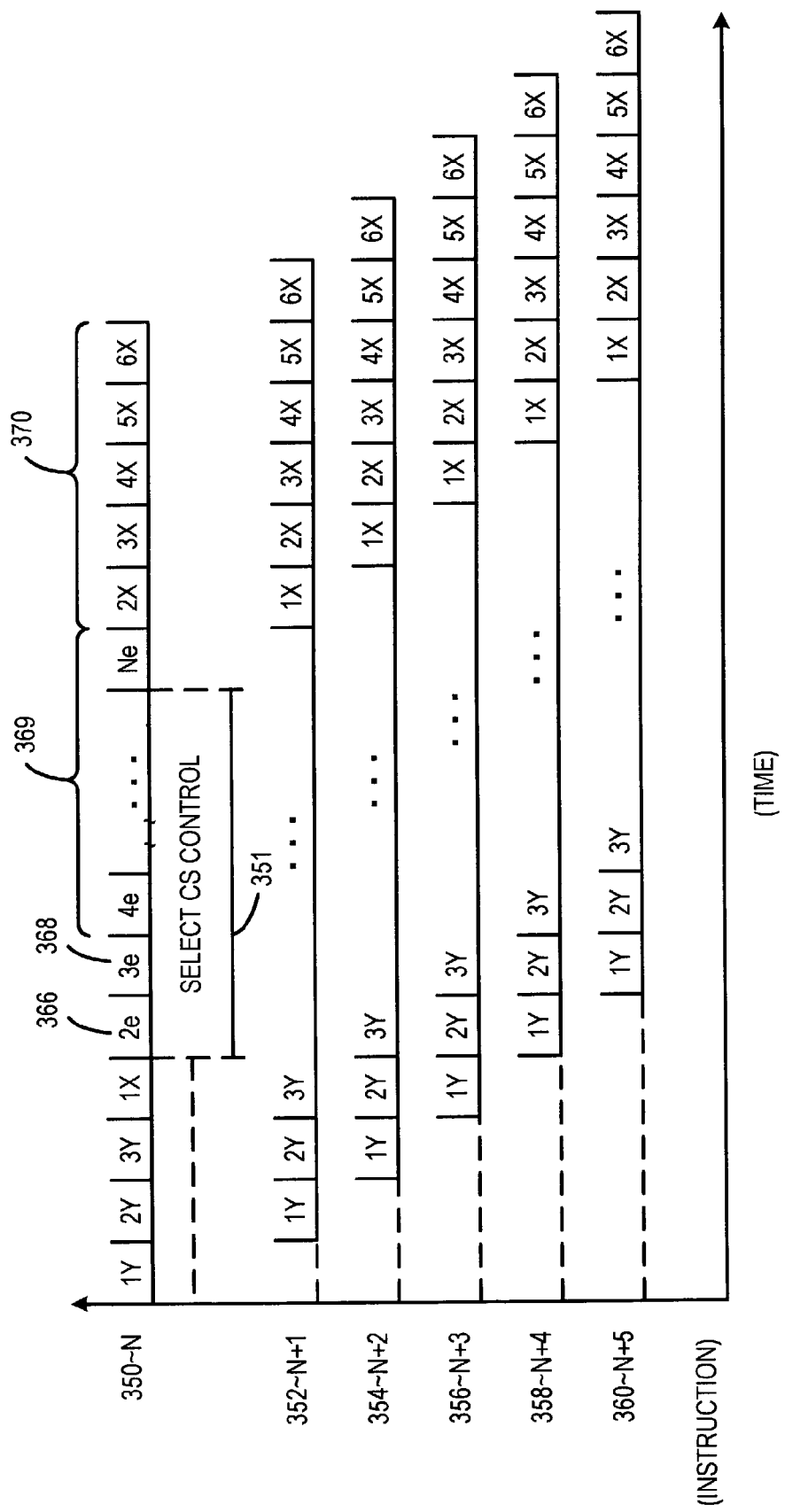
FIG. 5 is a timing diagram illustrating execution of an extended-mode instruction.

FIG. 5 is a timing diagram illustrating execution of an extended-mode instruction. In this diagram, instruction N 350 is an extended-mode instruction, and all remaining instructions N+1 352 through N+5 360 are single-cycle instructions. Instruction N is loaded into F0 register 164a to initiate the start of cycle 1X. During this cycle, control of the machine is provided by instruction decode 164 in the manner discussed above. At the end of 1X cycle, select_CS_control signal 174 is provided to CS section 170, as shown by waveform 351. During 2e cycle 366, instruction decode 164 continues to exert control over the various logic sections of the IP. By 3e cycle 368, however, CS section 170 has obtained data signals from the microcode storages devices 173 in the manner discussed above. This data is selected by select_CS_control signal 174, and is driven onto lines 176 to control the other logic sections of the IP. CS section 170 thereby assumes control over instruction execution. Execution may continue in this manner for a predetermined number of extended cycles shown as cycles 4e through Ne 369. During the final extended cycle, shown as cycle Ne, select_CS_control signal 174 is cleared, and instruction decode 164 re-assumes control over instruction execution for the remaining 2X through 6X cycles 370.

Figure 6:
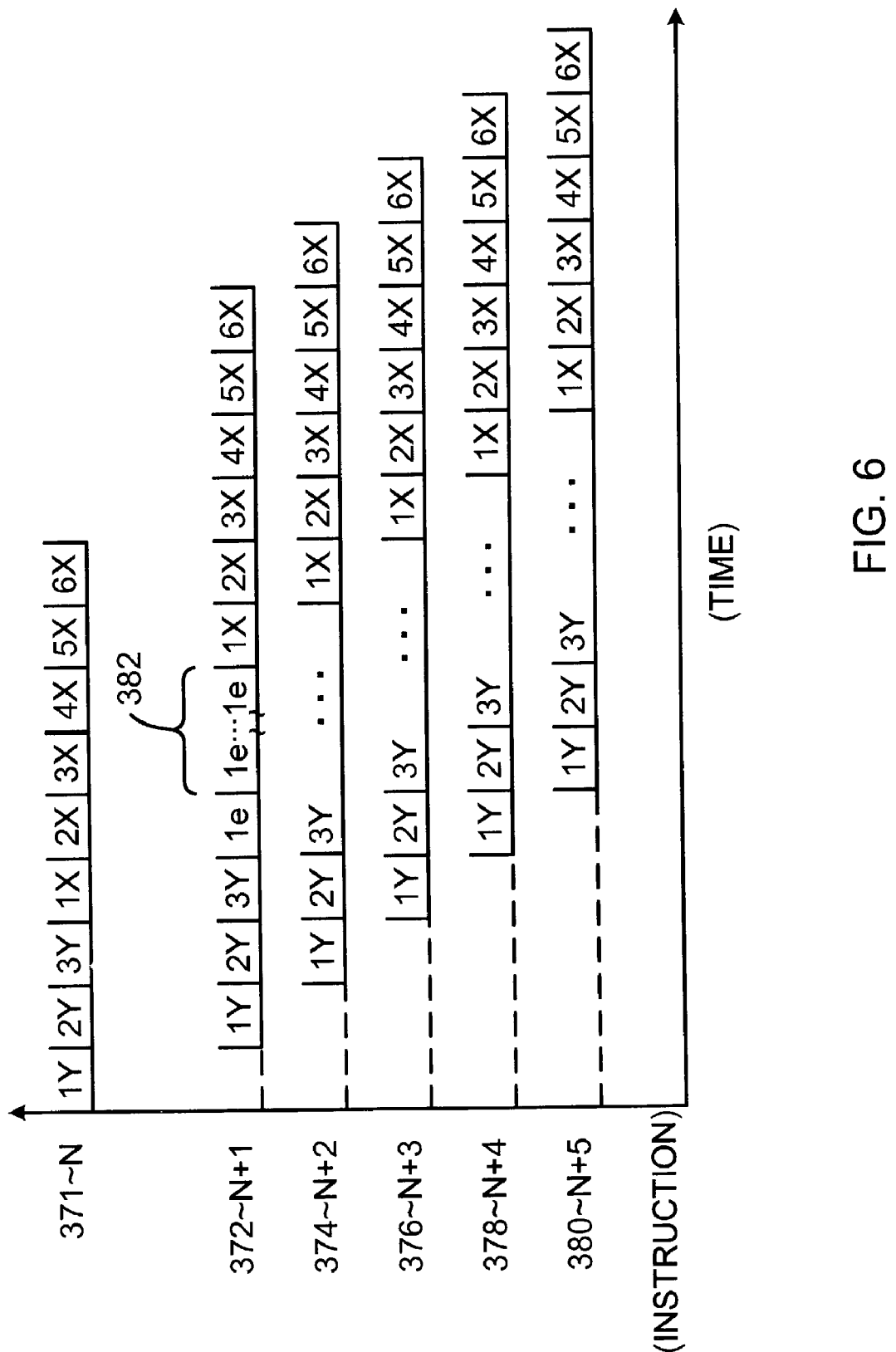
FIG. 6 is a timing diagram illustrating the manner in which a cache miss affects pipeline execution.

FIG. 6 is a timing diagram illustrating the occurrence of a cache miss. Single-cycle instruction 371 is loaded into F0 register 164a at the start of the 1X cycle. The next cycle, it is determined that instruction N+1 372 is not resident within I-FLC 30. This causes a request to be issued to SLC 34 for retrieval of the instruction. During this time, cycles are "slipped" waiting for the return of the instruction. The number of slipped cycles that are inserted, shown as 1e cycle 382, depends on whether the instruction is resident within SLC 34, and if not, where the instruction resides within the system. While the instruction is being fetched, instruction decode 164 provides null signals to all logic sections to prevent initiation of any processing activities for instruction N. Processing for other instructions within the pipeline continues unaffected. The cache miss also causes slipped cycles to be inserted between 3Y and 1X cycles for instructions N+2 374 through N+5 380, thereby delaying their execution.

The above-described FIGS. 3 through 6 illustrate some of the complexities associated with pipelined instruction execution. In the current embodiment, at least three types of instructions exist, including single-cycle, two-cycle, and extended-mode instructions. Any combination of these instruction types may be present within the pipeline at once. As a result, the manner in which instruction execution will be overlapped is not predictable, and includes a myriad of combinations. Additionally, a cache miss may occur while fetching any instruction, further increasing the number of possible scenarios. As a result, implementing a pipeline control mechanism is a very complex task.

The way in which an instruction is processed within the pipeline is further affected by the various system occurrences that may delay, or even completely terminate, the processing of a given instruction within the pipeline. Such system occurrences may include errors such as parity, addressing, or other errors. Other types of events such as interrupts, jumps, detected conflicts, and skips cause the re-direction of execution flow. As with error conditions, these types of events generally terminate the execution of some of the instructions within the pipeline. When execution is terminated, it is imperative that all effects of instruction execution be nullified so it appears as if the execution was never initiated. That is, no signals or temporarily stored data resulting from the execution of the aborted instructions must remain within the IP. At the same time, unaffected instructions must be allowed to execute to completion.

As discussed above, abort logic 204 of the current invention generates the various abort signals that are used to delay and/or to abort instruction execution. Abort logic 204 receives error conditions, jump and skip indicators, interrupt and conflict signals, and other similar indicators on lines 202 and 206 from all parts of the IP. Abort logic uses these events to generate various abort signals that are provided on lines 206 to control pipeline execution of the other logic sections. These abort signals are described in the following paragraphs.

FIG. 7 is a timing diagram illustrating the activation of a current_abort signal shown as waveform 400. A current_abort signal may be raised during the 1X cycle of instruction execution for any type of instruction. This signal may be activated because of conflicts occurring within GRS. For example, if instruction execution updates a GRS register that is to be read by the next instruction in the instruction stream, execution for the next instruction must be slipped by activating current_abort signal. Additionally, certain jump and skip conditions cause write operations to be performed to I-FLC 30, interfering with the pre-fetching of the next instructions. The current_abort signal is raised to delay the 1X cycle for these instructions. Other pre-fetch conditions occurring in one of the cycles prior to the 1X cycle may also cause the current_abort signal to be activated.

When the current_abort signal is activated, all logic sections must nullify the effects of instruction execution for the instruction in the 1X cycle so that it appears as if the cycle never occurred. All interrupts generated during this time must be suppressed, and any microcode reference must be discarded. For an extended-mode instruction, this signal prevents select_CS_control signal 174 from activating so that CS section 170 does not gain control of the pipeline.

As long as the current_abort signal remains active, cycles are "slipped" for instruction N. During this time, instruction decode 164 provides control signals that effectively cause all other logic within the system to enter an idle state so that no processing is performed for instruction N. Previous instructions such as instruction N−1, N−2, and etc. are not affected by this signal. The slipped cycles are shown as additional 1e cycles 402 for instruction 404. When current_abort signal is deactivated, instruction execution resumes with the 2X cycle for instruction N. At this time, the next instruction in the instruction sequence N+1 406 is loaded into F0 register 164a to begin its 1X cycle. Instruction overlap is thereby resumed in the manner discussed above.

FIG. 8 is a timing diagram illustrating activation of a late_abort signal. The late_abort signal, illustrated as waveform 420, is a relative signal that may be raised at any time. This signal is used to terminate any instruction execution that was initiated during the previous cycle. For example, assertion of the late_abort signal causes execution of single-cycle instruction N 422 to terminate because it was loaded into F0 register 164a during the cycle before the late_abort signal was asserted. Additionally, if the late_abort signal is activated during extended-mode instruction execution, the signal will terminate any processing activities that were initiated by a microcode instruction read from microcode storage device 173 during a previous cycle. This can best be explained by example.

Returning to FIG. 5, assume the late_abort signal is asserted during 4e cycle of extended-cycle instruction execution for instruction N 350. Because of the extended-cycle execution, no instruction was loaded into F0 register 164a during the previous 3e cycle. However, pipeline operations were initiated as a result of microsequencer 171 obtaining a microcode instruction from microcode storage device 173. These pipeline operations are terminated by the assertion of late_abort signal. All other operations initiated by other microcode instructions are allowed to continue unaffected.

Figure 9:
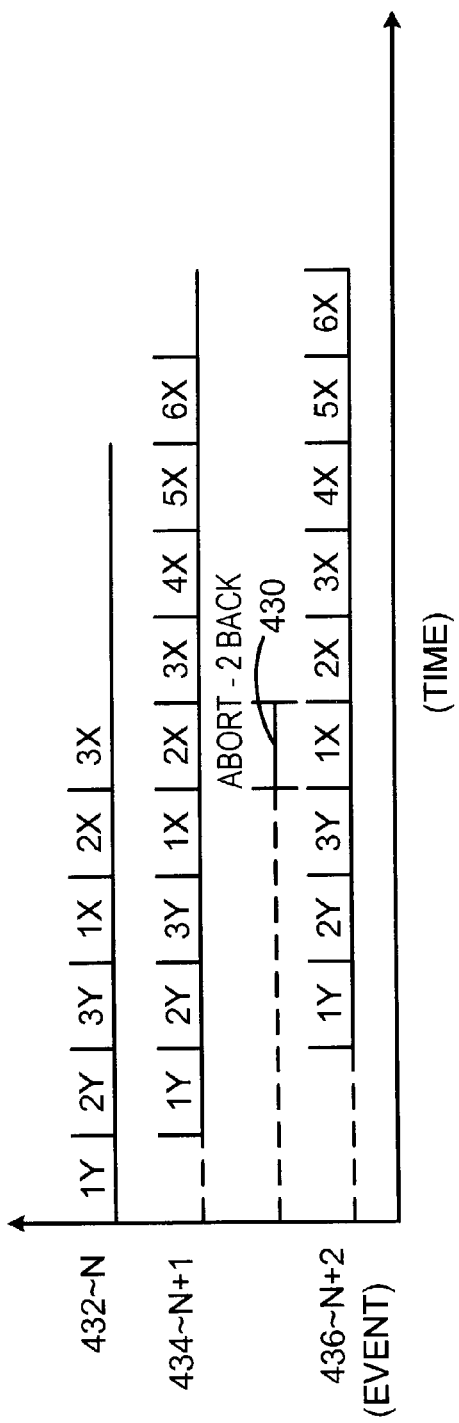
FIG. 9 is a timing diagram illustrating the effects of an abort-2back signal.

FIG. 9 is a timing diagram illustrating the effects of an abort-2back signal, shown as waveform 430. This signal is activated when it is determined that a jump was taken, or when certain interrupts are received. When this signal is raised, it results in the termination of the instruction that entered F0 register 164a two cycles beforehand. In the current example, the abort-2back signal terminates execution of instruction N 432. Execution of other instructions such as instruction N+1 434 and N+2 436 are not affected by the assertion of this abort signal.

As is the case described above in reference to FIG. 8, if no instruction entered the pipeline two cycles before the assertion of the abort-2back signal, the signal is used to nullify the effects of processing initiated two cycles ago by a microcode instruction read from microcode storage device 173.

Figure 10:
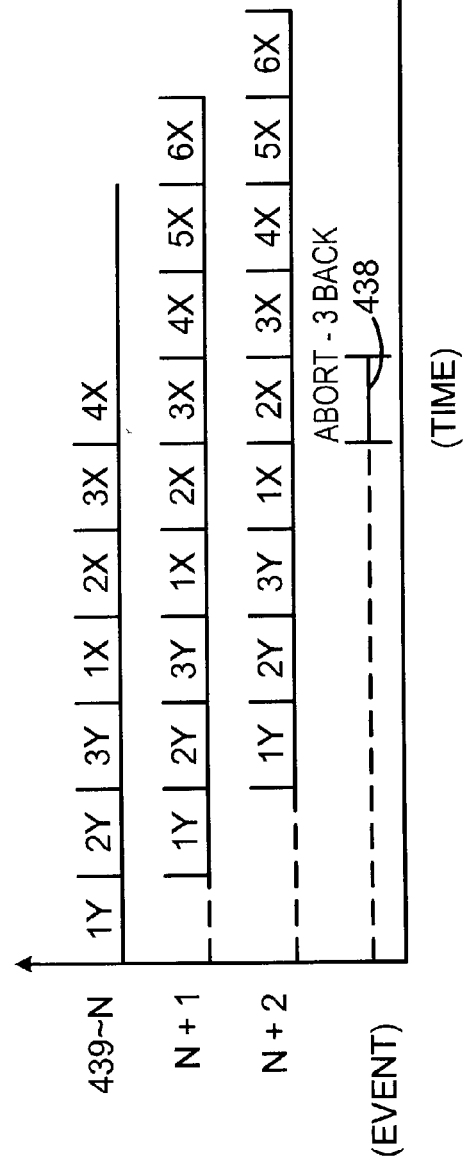
FIG. 10 is a timing diagram illustrating the effects of an abort-3back signal.

FIG. 10 is a timing diagram illustrating the effects of an abort-3back signal shown as waveform 438. When asserted, this signal results in the termination of processing activities for the instruction that entered F0 register 164a three cycles ago. In the current example, the abort-3back signal terminates execution of instruction N 439. As is the case described above in reference to FIGS. 8 and 9, if no instruction entered the pipeline three cycles before the assertion of the abort-3back signal, the signal is used to nullify the effects of the processing initiated by a microcode instruction read three cycles before. Execution initiated during all other cycles of instruction N remains unaffected.

As can be appreciated from the above description, within the IP, logic is needed to track instruction flow through the pipeline. This logic must handle the assertion of the various abort signals in a manner that voids the appropriate instruction while leaving other logic states unaffected. In prior art systems, this logic is distributed throughout all logic sections of the IP including O-FLC 28, operand address generate logic 180, arithmetic logic 194 and addressing environment 190. In such systems, abort logic 204 provides all logic sections with various signals that may be similar to those discussed above. Each logic section is responsible for interpreting these abort signals along with other signals indicating the state of the pipeline. In response, each logic section must take appropriate action to either delay or void the execution of one or more instructions within the pipeline. As previously mentioned, the voiding of execution involves nullifying all processing activities initiated by the aborted instruction while ensuring execution for the remaining instructions that are resident in the pipeline is unaffected. This is an extraordinarily complex endeavor, considering each logic section is pipelined so that processing for up to six instructions is occurring in overlapped fashion. Furthermore, this overlapped instruction execution is not occurring in any predictable manner, since the number of ways the pipeline may be filled is virtually infinite.

B. Detailed Description of the Invention

Figure 11:
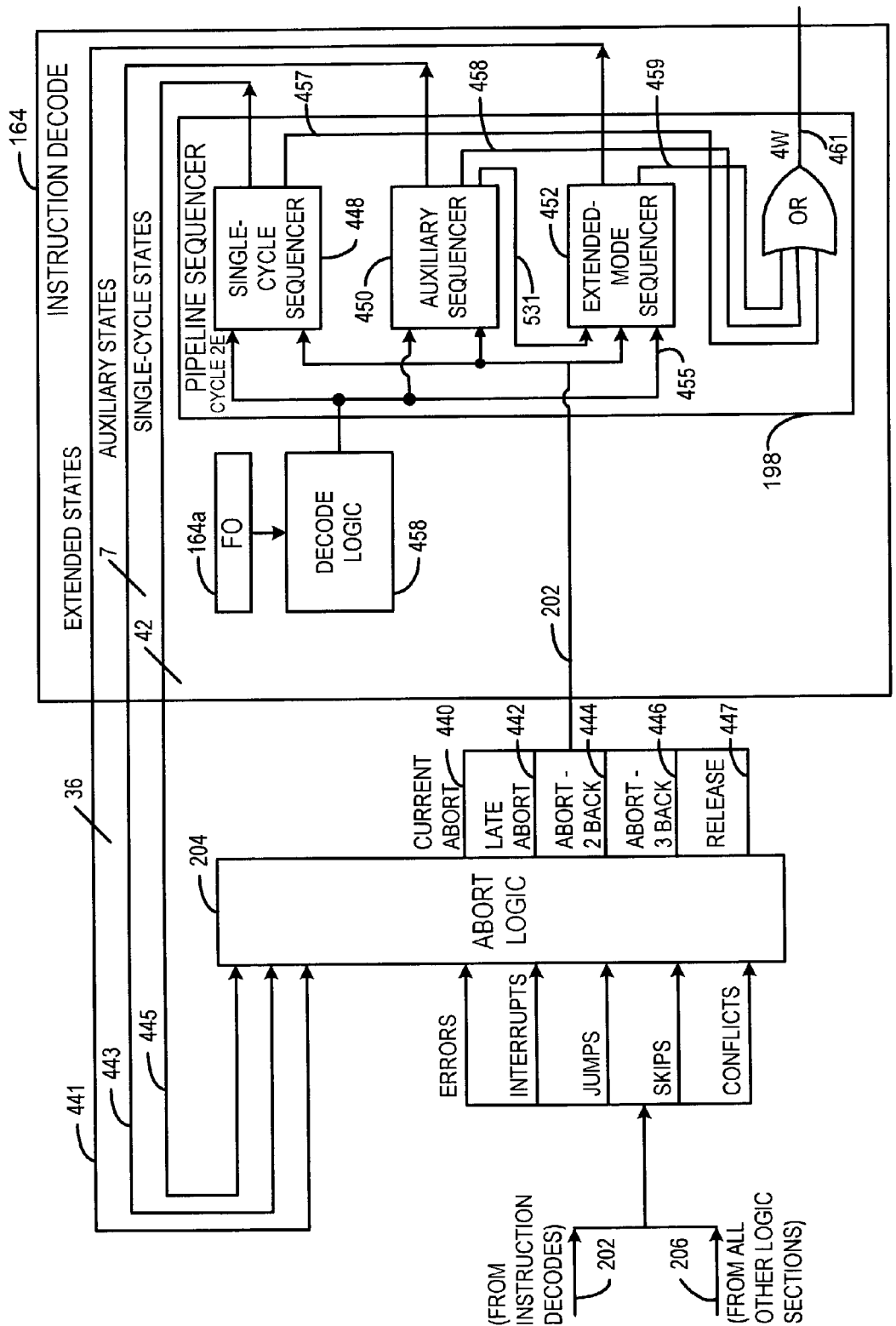
FIG. 11 is a logic block diagram illustrating abort logic and pipeline sequencer in more detail.

FIG. 11 is a logic block diagram illustrating abort logic 204 and pipeline sequencer 198 of FIG. 2 in more detail. Together, abort logic 204 and pipeline sequencer 198 comprise one embodiment of the centralized pipeline control mechanism of the current invention. As described above, abort logic 204 receives signals from all other logic sections to indicate all errors, conflicts, and any other signals that delay or terminate execution for one or more instructions. Abort logic also receives signals such as interrupts, jumps, and skips that indicate that some type of execution re-direction is possible. These signals are provided by instruction decode 164 on lines 202, and from all other logic sections on lines 206 (see FIG. 2). According to the current invention, abort logic 204 uses the error and other execution re-direction signals along with state bits that are provided on lines 441, 443, and 445 by pipeline sequencer 198 to generate the abort signals discussed above. The way in which the state bits are used to generate the abort signals will be discussed below.

The various abort signals of the current embodiment include current abort 440, late abort 442, abort-2back 444, and abort-3back 446. An additional release signal is provided on line 447. These signals are provided to pipeline sequencer 198 on lines 202 (FIG. 2). These signals need not be provided to the other logic sections in the IP, as will become apparent from the following discussion.

Pipeline sequencer 198 is a microsequencer included within instruction decode section 164. This microsequencer models instruction execution within the instruction pipeline. Pipeline sequencer includes three sub-sections. Single-cycle sequencer 448 models the execution of single-cycle instructions, auxiliary sequencer 450 models the 1X cycle of two-cycle and extended-mode instructions, and extended-mode sequencer 452 models the extended cycles of extended-mode instruction execution.

Each of the sequencers 448, 450, and 452 generates an enable signal shown on lines 457, 458, and 459, respectively. These enable signals are "ORed" to generate a 4W_enable on line 461. This enable signal is provided by instruction decode along with other signals on lines 182 (FIG. 2) to all logic sections to control pipeline execution, as will be discussed below.

Pipeline sequencer 198 is controlled by various signals generated by, or provided to, instruction decode 164. These signals include the I-cache_miss signal provided by instruction read address control 154 on line 169, and a cycle_2e signal 455, which is a signal activated by decode logic 458 prior to the time a two-cycle instruction is loaded into F0 register 164. This signal is read from a microcode RAM as part of the instruction pre-decode process. The use of these signals will be discussed further below.

Figure 12:
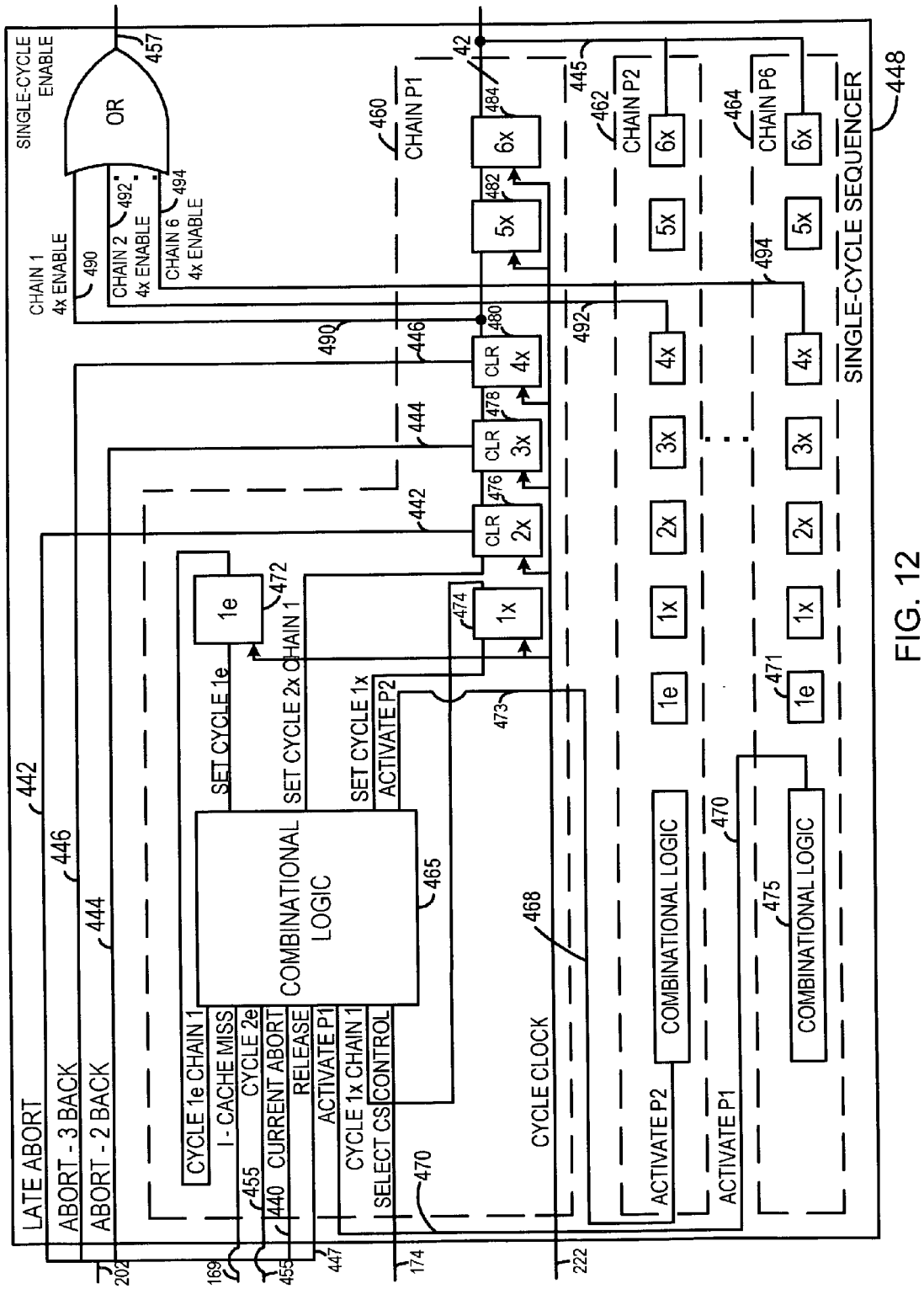
FIG. 12 is a logic block diagram of the single-cycle sequencer.

FIG. 12 is a logic block diagram of single-cycle sequencer 448. This sequencer models all possible states that exist when up to six single-cycle instructions are resident within the pipeline at once. The sequencer of the current embodiment includes six timing chains, although for simplicity, only three chains P1 460, P2 462, and P6 464 are illustrated (shown dashed). Chains P2 and P6 are shown in abbreviated format that does not include the interconnections. However, it will be understood that each chain includes logic similar to that shown for chain P1 460. Each of the six timing chains is controlled by respective combinational logic shown as combinational logic 465 for chain 1 460. Each timing chain includes seven state devices such as flip-flops to model execution of a respective instruction as it moves through the pipeline. Each of these state devices is clocked by cycle clock signal 222. This signal has a period equal to one cycle, as discussed above.

Within each timing chain, six of the state devices represent a respective one of the 1X through 6X cycles of single-cycle instruction execution. Each timing chain further includes a 1e state device shown as 1e state device 472 for timing chain P1 460. This state device models a 1e cycle that occurs during single-cycle instruction execution when a miss to I-FLC 30 occurs as shown in FIG. 6. This state device further models the 1e cycle that results when current_abort signal 440 is activated in the manner shown in FIG. 7. The 1e state device is also used to record the fact that an extended-mode instruction is being modeled, and to set a 2X state device to represent the 2X cycle of extended-mode instruction execution. Finally, the 1e state device is used to activate another timing chain. Each of these scenarios will be discussed below.

In the current embodiment, timing chains are assigned for use in sequential order. That is, if timing chain P1 460 is being used to model an instruction N, timing chain P2 462 will be used to model the next instruction N+1 in the instruction stream, and so on. After timing chain P6 464 is used to model an instruction, chain P1 460 will be used to model the next instruction. The activation of a timing chain is controlled by the combinational logic for a previous timing chain. For example, combinational logic 465 controls activation of timing chain P2 462 by generating an activate_P2 signal 473 to set one of the state devices within chain P2 462. A similar activate_P1 signal 470 is provided from chain P6 464 combinational logic, and so on.

A timing chain is activated when the 1e state device within the previous timing chain is cleared. For example, chain P1 460 is activated when a 1e state device within chain P6 464 is cleared. The significance of clearing of 1e state device within a previous timing chain is discussed below. The activation of a timing chain can be accomplished in several ways, depending on the processing activities occurring within the pipeline at a given time. In some cases, the activation of the next timing chain involves setting just the 1e state device for that chain. In other cases, the activation of the timing chain involves setting both the 1e and 1X state devices at the same time. The activation of timing chains is discussed in detail in reference to the following examples.

The use of single-cycle sequencer 448 can best be understood by example. Assume that six single-cycle instructions N through N+5 appear sequentially within the instruction stream. These six instructions will be assigned to chains P1 460 through P5 464, respectively. It will be recalled that this will be the case if the instruction prior to instruction N was assigned to chain P6 464.

The cycle before 1e state device 471 of chain P6 464 is to be cleared, combinational logic 475 of chain P6 464 asserts activate_P1 signal 470. This will enable activation of chain P1. The next cycle, at least one state device within chain P1 will be set. The state devices that are set within chain P1 depends on the events occurring within the pipeline for instruction N. If a cache miss does not occur when instruction N is being fetched, both state device 1X 474 and state device 1e 472 are set by combinational logic 465 in response to the activate_P1 signal 470. These state devices are set when instruction N is loaded into F0 register 164a. This setting of the 1X state device 474 in conjunction with the setting of the 1e state device 472 models the start of cycle 1X.

In some cases, a cache miss occurs while fetching an instruction. If this occurs when instruction N is being fetched, an I-cache_miss signal will be provided to combinational logic 465 on line 169. Combinational logic 456 will activate only the 1e state device 472 without activating 1X state device 474. The setting of 1e state device 472 without the setting of 1X state device 474 models the 1e cycles that occur during a cache miss, as illustrated in FIG. 6.

When the I-cache_miss signal is de-activated, combinational logic 465 sets 1X state device 474. This represents the occurrence of 1X cycle for instruction N. If current_abort signal 440 is not activated during 1X cycle, combinational logic 465 clears the 1X and 1e state devices 474 and 472, respectively, and asserts activate_P2 signal 473 one cycle later. The assertion of activate_P2 signal 473 activates chain P2 462. Also at this time, combinational logic 465 sets the 2X state device 476 to model the start of 2X cycle for instruction N.

In some instances, current_abort signal 440 will be asserted during 1X cycle, as is shown in FIG. 7. If this occurs for instruction N, combinational logic 465 allows the 1e state device 472 to remain set. 1X state device 474 is cleared, and 2X state device 476 remains cleared. This represents the 1e cycle illustrated in FIG. 7 with respect to the current_abort signal. These states are maintained until current_abort signal 440 deactivates. When current_abort signal 440 clears, combinational logic 465 sets 2X state device 476, and clears the 1X and 1e state devices 474 and 472. The activate_P2 signal 473 is also asserted at this time to activate chain P2 462.

The setting of 2X state device 476 represents 2X cycle. This state device may be cleared by the assertion of late_abort signal 442. This represents the timing discussed above in reference to FIG. 8 wherein processing initiated one cycle ago is voided by late_abort signal 442. Otherwise, if late_abort signal 442 is not activated, 3X state device 478 is set and 2X state device 476 is cleared one cycle after the 2X state device is set. This represents the occurrence of 3X cycle for instruction N. The 3X state device 478 may be cleared by the occurrence of abort-2back signal 444. This represents the functionality described above with respect to FIG. 9, wherein abort-2back signal 444 clears processing initiated two cycles ago. If abort-2back signal 444 is not activated, 3X state device 478 is cleared and 4X state device 480 is set one cycle after the 3X state device is set, representing the occurrence of the 4X cycle for instruction N. The 4X state device 480 may be cleared by the activation of abort-3back signal 446. This represents the use of abort-3back signal as discussed in regards to FIG. 10. If the abort-3back signal is not activated, 5X state device 482 is set the following cycle, and state device 480 is cleared. This represents cycle 5X for instruction N execution. Finally, on the next cycle, 6X state device 484 is set while 5X state device 482 is cleared, representing the occurrence of 6X cycle.

As each single-cycle instruction N+1 through N+5 enters the instruction pipeline, another timing chain is activated in the manner discussed above. The setting of a 1X state device and/or a 1e state device within a timing chain is controlled by the activation of an activate_Px signal for the previous chain. This results in the activation of a 1X and/or 1e state device for an instruction at substantially the same time a 2X state device is activated for a previous instruction. This models the way in which instruction execution is overlapped within the pipeline for two consecutive single-cycle instructions, as is illustrated in the timing diagrams of FIGS. 3, 6, and 7 discussed above.

Single-cycle sequencer 448 generates a single-cycle_enable signal on line 457. This signal is obtained by "ORing" the outputs of the 4X state devices for all timing chains, including the chain_1_4X_enable signal on line 490, the chain_2_4X enable signal on line 492, and the chain_6_4x_enable signal on line 494. The single-cycle_enable signal is used by the various logic sections to enable the capturing of staged processing results in a manner that greatly simplifies pipeline control. This will be discussed in detail below.

Single-cycle sequencer 448 makes the states of all state devices available to abort logic 204 on lines 445. Although for simplicity, FIG. 12 illustrates just the output of the 6X state devices being provided in this manner, it will be understood that abort logic 204 is provided visibility to all states of all state devices included within single-cycle sequencer. These forty-two single-cycle state signals provided on lines 445 are used to generate the abort signals, as will be discussed below.

As discussed above, single-cycle sequencer 448 is used primarily to model execution of single-cycle instructions. During two-cycle or extended-mode instruction execution, the auxiliary sequencer 450 and extended-mode sequencer 452 are also needed as follows.

During two-cycle instruction execution, two cycles elapse between the time the instruction is loaded into F0 register 164*a* and the time a next instruction is loaded into the F0 register. These cycles are shown as cycle 1X 332 and cycle 2*e* 334 of FIG. 4. During cycle 1X, decode of the instruction in F0 register 164*a* initiates operations that are very similar to those initiated within the pipeline when a single-cycle instruction is loaded into F0 register 164. Specifically, during the 1X cycle, signals generated by instruction decode 164 are used by O-FLC 28 to generate an address for the O-FLC 28, as would occur during cycle 1X for a single-cycle instruction. Likewise, during the following 2X cycle, O-FLC 28 captures the operand address that was generated during the 1X cycle and begins the operand read operation. This is similar to the operation occurring during the 2X cycle of single-cycle instruction execution. During the next cycle, arithmetic logic 194 captures data from its microcode RAM in preparation for performing any arithmetic operations that will occur during the following cycles. This is similar to the 3X cycle of single-cycle instruction execution, and etc. In sum, the 1X window of two-cycle instruction execution initiates a sequence of events that is similar to the pipeline processing activities initiated by a 1X window of a single-cycle instruction.

For two-cycle instructions an additional operand is needed to complete instruction execution. Therefore, the 2e cycle is required following 1X cycle to generate an additional address that will be needed by O-FLC 28 to retrieve this second operand. In a manner similar to that described above for the 1X cycle, signals provided by instruction decode 164 during the 2e cycle are used by O-FLC 28 cycle to generate an address for the additional operand. This is similar to 1X activities occurring during single-cycle instruction execution. During the following cycle, O-FLC 28 captures the operand address that was generated during the previous 2e cycle. This is similar to 2X cycle activities for single-cycle instruction execution, and so on. Therefore, the 2e window, like the 1X window, initiates a sequence of events that are similar to those of single-cycle instruction execution. This is discussed further in reference to FIG. 13.

Figure 13:
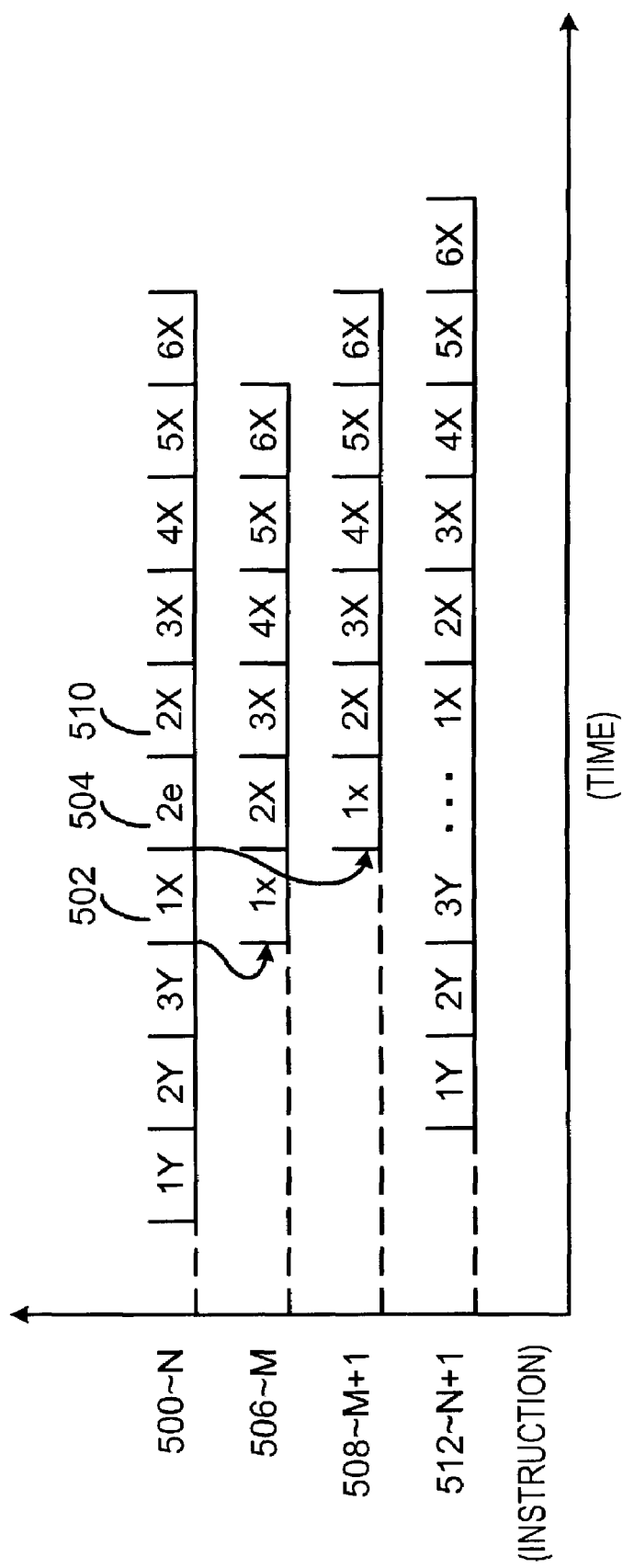
FIG. 13 is a timing diagram illustrating the affects of two-cycle instruction execution within the pipeline.

FIG. 13 is a timing diagram illustrating the execution of a two-cycle instruction N 500 that includes cycles 1X 502 and 2*e* 504. During each of these cycles, processing activities are initiated that may each be modeled by single-cycle instruction execution. That is, the activities initiated by 1X cycle 502 of instruction N 500 may be modeled by waveform M 506, showing the six cycles of single-cycle instruction execution. Similarly, the activities initiated during cycle 2*e* 504 may likewise be modeled as a single-cycle instruction, as illustrated by waveform M+1 508.

This foregoing method of modeling cycles 1X and 2*e* is implemented within pipeline sequencer 198 using both auxiliary sequencer 450 and extended-mode sequencer 455. The auxiliary sequencer 450 is used to model the activities initiated during the 1X cycle of two-cycle instruction execution, which are illustrated by waveform M 506 of FIG. 13. Extended-mode sequencer 452 is used to model activities that are initiated during the 2e cycle, and which are represented by waveform M+1 508 of FIG. 13.

Figure 14:
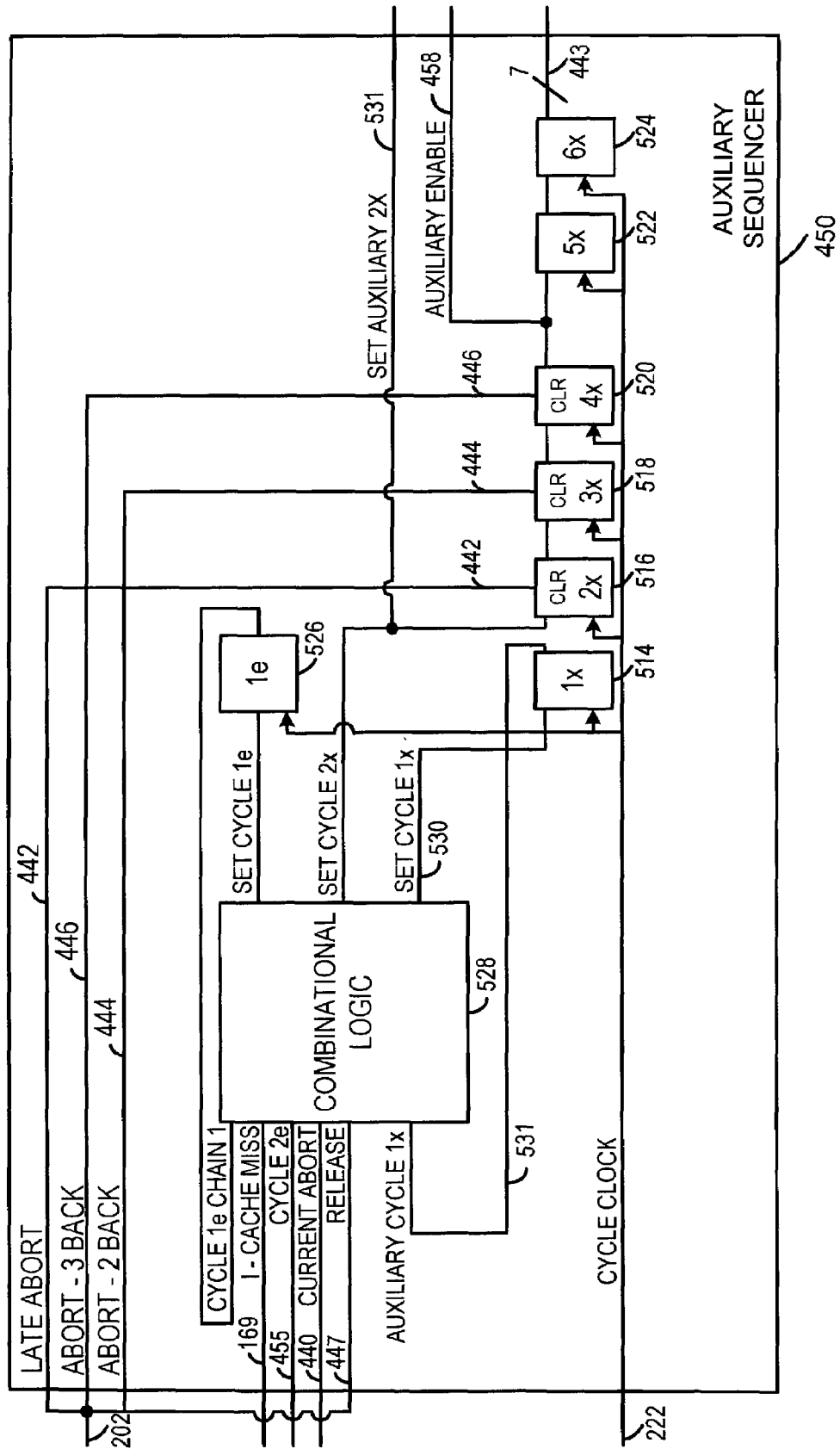
FIG. 14 is a logic block diagram of the auxiliary sequencer.

FIG. 14 is a logic block diagram of auxiliary sequencer 450. This sequencer includes a single timing chain that includes seven state devices. Each of these state devices is clocked by cycle clock signal 222. Six of these state devices 514 through 524 are provided to model 1X through 6X cycles in the manner discussed above with respect to FIG. 12. An additional state device 526 is provided to model cycle 1*e*. This modeling is accomplished as follows.

Before execution for a two-cycle instruction begins, the cycle_2e signal 455 activates. As discussed above in reference to FIG. 11, this signal is activated by decode logic 458 prior to the time a two-cycle or extended-mode instruction is loaded into F0 register 164. Pipeline sequencer 198 uses activation of this signal to detect the loading of a two-cycle or an extended-mode instruction into F0 register 164*a*.

When cycle_2e signal 455 is activated, a 1e state device within the next available timing chain of single-cycle sequencer 448 sets. The activation of the timing chain is controlled in the manner discussed above with respect to FIG. 12. In this instance, the setting of this flip-flop is used as a placeholder to record that instruction execution is being modeled by the auxiliary and extended-mode sequencers.

Activation of cycle_2e signal 455 is also detected by combinational logic 528 within auxiliary sequencer 450. Combinational logic 528 sets 1X state device 514 during the start of the 1X cycle if a cache miss does not occur for the two-cycle instruction. If, however, a cache miss occurs, combinational logic 528 detects assertion of I-cache_miss signal 169. As a result, 1e state device 526 is set instead of 1X state device 514.

The 1e state device will remain activate until the I-cache_miss signal on line 169 is de-activated, indicating that the two-cycle instruction is available to be loaded into F0 register 164a. When this signal is de-activated, 1X state device 514 will set the next cycle, indicating the start of the 1X cycle for the two-cycle instruction.

In the following cycles, setting and clearing of the various state devices occurs in a manner similar to that discussed above in reference to the timing chains of single-cycle sequencer 448. One cycle after 1X state device 514 is set, combinational logic 528 clears the 1X state device 514 and sets the 2X state device 516 if current_abort signal 440 is not active. If, however, current_abort signal 440 is active, combinational logic 528 sets the 1e state device 526 instead. The 2X state device 476 is not set until current_abort signal 440 deactivates. This represents the pipeline timing illustrated in FIG. 7 with respect to the current_abort signal.

When current_abort signal 440 clears, combinational logic 528 sets 2X state device 516. This device may be cleared by the assertion of late_abort signal 442, as discussed in reference to FIG. 8. Otherwise, if the late_abort signal 442 is not activated, 3X state device 518 is set and 2X state device 516 is cleared one cycle after the 2X state device is set. The 3X state device 518 may be cleared by the occurrence of abort-2back signal 444 in the manner described above with respect to FIG. 9.

If abort-2back signal 444 is not activated, 3X state device 518 is cleared and 4X state device 520 is set one cycle after the 3X state device is set. The 4X state device 520 may be cleared by the activation of abort-3back signal 446 as discussed in regards to FIG. 10. If the abort-3back signal is not activated, 5X state device 522 is set the following cycle, and state device 520 is cleared. This represents cycle 5X for instruction N execution. Finally, on the next cycle, 6X state device 524 is set while 5X state device 522 is cleared.

The output of 4X state device 520 is provided as auxiliary_enable signal on line 458 to abort logic 204. This signal will be used to generate 4W_enable 461, which, in turn, will be provided to the various logic sections to provide uniform pipeline control according to the current invention. This is described further in the following paragraphs.

Auxiliary sequencer 450 makes the states of all state devices within the sequencer available on lines 443 to abort logic 204, as shown in FIG. 11, although for simplicity only the output of the 6X state device 524 is shown being provided in this manner. These seven auxiliary states are used to generate the abort signals, as will be discussed below. Auxiliary sequencer further makes the set_auxiliary_2X signal available on line 531 to extended-mode sequencer 452. This signal is used to activate a timing chain within extended-mode sequencer 452 to model the 2e cycle of two-cycle instruction execution. The use of extended-mode sequencer 452 in modeling a 2e cycle is discussed in the following paragraphs.

Figure 15:
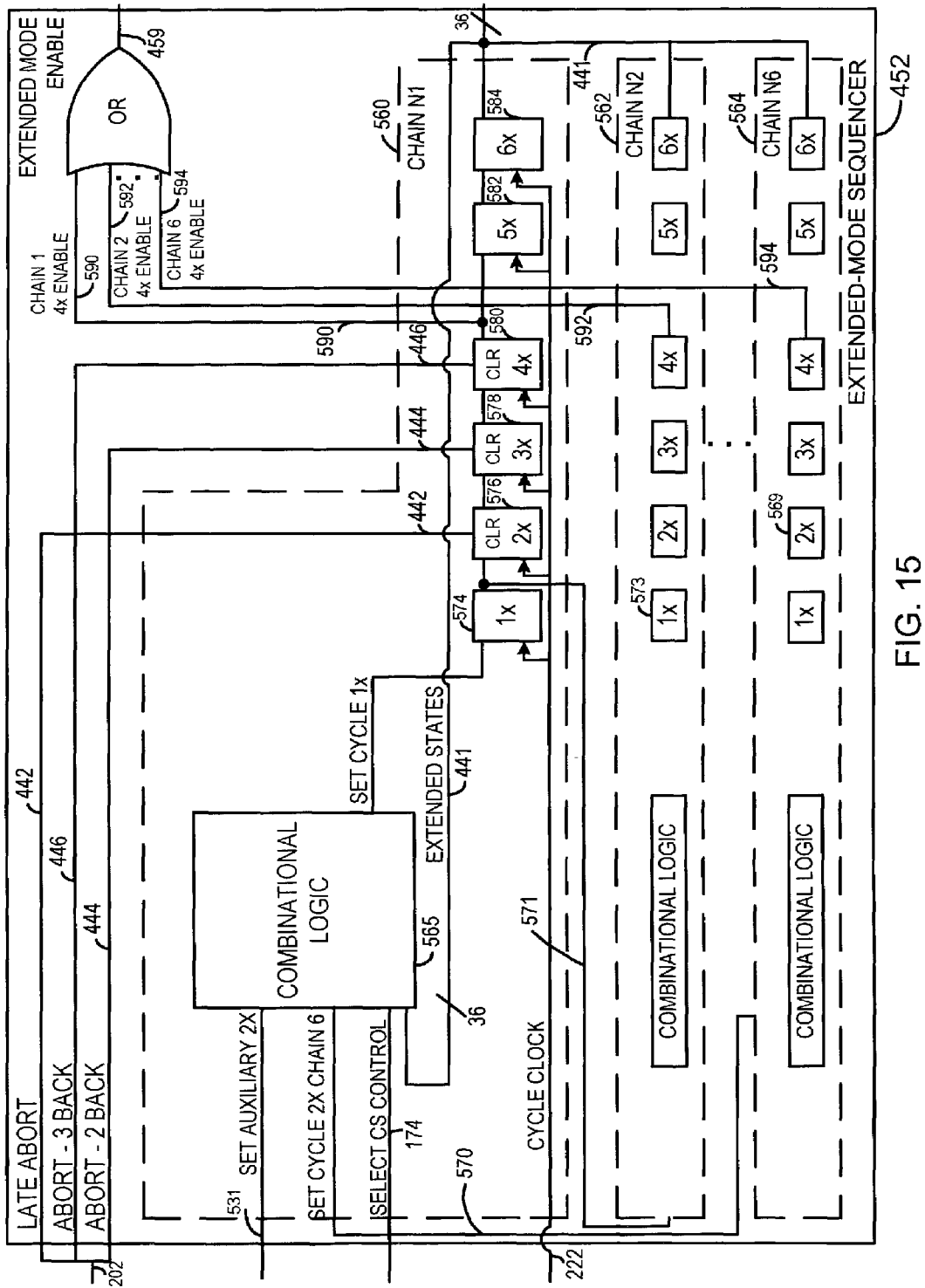
FIG. 15 is a logic block diagram of the extended-mode sequencer.

FIG. 15 is a logic block diagram of extended-mode sequencer 452, which is similar to the sequencer of FIG. 12. For reasons to be discussed further below, extended-mode sequencer 452 of the current embodiment includes six timing chains. For simplicity, only three chains N1 560, N2 562, and N6 564 are illustrated (shown dashed), with timing chain N1 560 being shown in detail. It will be understood that each chain includes logic similar to that shown for chain N1 560.

Each timing chain includes combinational logic such as combination logic 565 shown for chain 1 560. Each timing chain further includes six state devices such as flip-flops to model cycles 1X through 6X. These are shown as state devices 574 through 584. Each of these state devices is clocked by cycle clock signal 222.

Extended-mode sequencer 452 is also used to model the 2e state of two-cycle instruction execution. As noted above, set_auxiliary_2X signal 531 is provided to extended-mode sequencer 452 at the start of 2e cycle of two-cycle execution. This will result in the setting of a 1X state device for an "available" one of timing chains N1 560 through N6 564.

Within extended-mode sequencer 452, activation of a timing chain is controlled by the combinational logic within each timing chain. This combinational logic has visibility to all state devices within the sequencer via lines 441. The combinational logic thereby determines which timing chain(s) are, or will be inactivated at any given time. A timing chain is thereby selected for activation during a next cycle. Other implementations are, of course, possible.

Within a given timing chain, after a 1X state device is set, the remaining 2X through 6X state devices are set during the following cycles in the manner discussed above with respect to FIG. 12. These state devices may be cleared by the various abort signals, including late_abort 442, abort_2back 444, and abort_3back 446 in the manner previously described. As discussed above, the use of this timing chain models processing activities shown as waveform M+1 508 of FIG. 13 for a two-cycle instruction.

Extended-cycle sequencer 452 generates extended-mode_enable signal on line 459. This signal is obtained by "ORing" the outputs of the 4X state devices for all timing chains, including the chain_1_4X_enable signal on line 590, the chain_2_4x_enable signal on line 592, and the chain_6_4x_enable signal on line 594. The extended-mode_enable signal is used by the various logic sections to enable the use of staged processing results, as will be discussed in detail below.

Extended-mode sequencer 452 provides the states of all thirty-six state devices to abort logic 204 on lines 441, although for simplicity, FIG. 15 shows only the output of the 6X state devices being provided in this manner. These thirty-six extended states are used to generate the abort signals, as will be discussed below.

The cycle_2e signal 455 remains active during the 1X and 2e cycles of two-cycle instruction execution. When the next instruction is loaded into F0 register 164a, which coincides with the start of 2X cycle for the two-cycle instruction, cycle_2e signal 455 is de-activated. This results in the clearing of a 1e state device within single-cycle sequencer 448. Recall that this state device was used as a "place-holder" to record that two-cycle instruction execution was occurring. At this same time, an activate_Px signal is generated within single-cycle sequencer. This signal is used to set the 1e and/or 1X state device within the next available timing chain in a manner discussed above.

The foregoing discussion describes the manner in which two-cycle instructions are modeled using both auxiliary sequencer 450 and extended-mode sequencer 452. In a similar manner, these two sequencers are used to model 2e through Ne cycles of extended-mode instructions. Before considering this modeling in detail, some discussion is provided concerning the types of logic operations that occur within the instruction pipeline during extended-mode instruction execution.

As discussed above in reference to FIG. 5, during execution of an extended-mode instruction, control is provided during the 1X and 2e cycles by instruction decode section 164. These cycles each initiate processing activities that may be modeled by 1X through 6X cycles, as shown in FIG. 13 for two-cycle instructions.

Additionally, during extended-mode instruction execution, select_CS_control signal 174 (FIG. 2) is activated at the end of the 1X cycle. This signal is provided to CS section 170 to allow CS section to drive control signals onto lines 176. CS section thereby assumes control of instruction execution after the 2e cycle. This control is maintained for all extended-mode cycles 3e through Ne that follow cycle 2e (see FIG. 5).

During each of the 3e through Ne cycles, CS section 170 is reading microcode instructions from microcode storage devices 173. Some of the bits included within these microcode instructions are provided on lines 176 to operand address generate logic 180. These signals initiate operations that are very similar to those initiated within the pipeline when a single-cycle instruction is loaded into F0 register 164. Specifically, during the first cycle, the signals are used to generate an address for the O-FLC 28, as would occur during the 1X cycle for a single-cycle instruction. Likewise, during the following extended-cycle 4e, O-FLC 28 captures the operand address that was generated during extended-cycle 3e and begins the operand read operation. This is similar to the operation occurring during the 2X cycle of single-cycle instruction execution. During the next cycle, arithmetic logic 194 captures data from its microcode RAM in preparation for performing any arithmetic operations that will occur during the following cycles. This is similar to the 3X cycle of single-cycle instruction execution, and etc. In sum, during each extended-mode cycle 3e through Ne, CS section 170 reads a microcode instruction. This microcode instruction may be thought of as a single-cycle instruction loaded into F0 register 164a. That is, the operations that are initiated by a microcode instruction parallel those operations initiated during 1X through 6X cycles of a single-cycle instruction.

Figure 16:
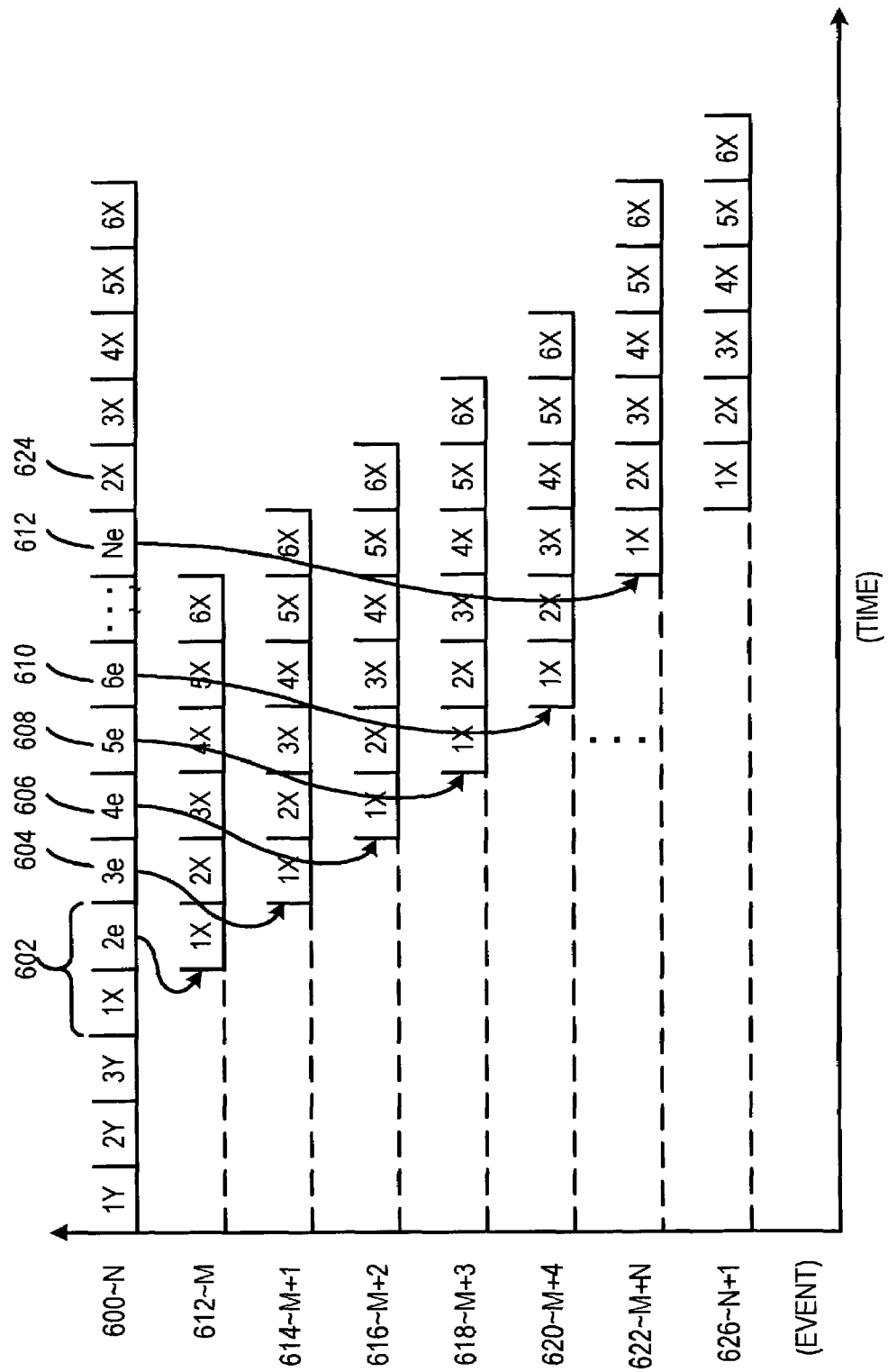
FIG. 16 is a timing diagram illustrating the affects of extended-mode instruction execution within the pipeline.

FIG. 16 is a timing diagram illustrating the execution of an extended-mode instruction N 600. During cycles 1X and 2e 602, execution is under the control of instruction decode 164. During each of the cycles 1X through 2e, processing activities are initiated that are similar to those described above with respect to two-cycle instruction execution. For example, the processing activities initiated during 2e cycle is shown by waveform M 612.

The remaining extended cycles 3e 604 through Ne 612 are controlled by CS section 170, as discussed above. During each of these cycles, a microcode instruction is read from a CS microcode RAM. This microcode instruction initiates processing steps within the various logic sections of the IP that are similar to the processing steps initiated by an instruction loaded into F0 register 164a. Therefore, for purposes of modeling the functions occurring within the pipeline, each extended cycle may be thought of as initiating the processing for a single-cycle instruction. For example, cycle 3e 604 may be thought of as initiating processing for a "virtual" single-cycle instruction, as represented by waveform M+1 614. Similarly, cycle 4e 606 may be thought of as initiating processing for a virtual single-cycle instruction represented by waveform M+2 616, and so on. This continues through cycle Ne 612, which initiates processing for a virtual instruction M+N 622 that is represented by waveform 622. Select_CS_ control signal 174 clears at the beginning of cycle Ne 612, so that instruction decode 164 re-assumes control over the pipeline during cycle 2X 624. At this time, a "real" instruction is loaded into F0 register 164a. This instruction is shown as single-cycle instruction N+1 626. This timing diagram thereby illustrates the manner in which pipelined execution continues within the various logic blocks during the time CS section 170 is controlling the logic sections within the IP.

The modeling of an extended-mode instruction may next be considered by returning to a discussion of FIGS. 14 and 15. Prior to an extended-mode instruction being loaded into F0 register 164a, cycle__2e signal 455 is activated within instruction decode 164. This signal indicates that execution for an extended-mode instruction is commencing. As noted above, activation of this signal causes 1X state device 514 of auxiliary sequencer 450 to set when the instruction is loaded into register F0 164a. Thereafter, auxiliary sequencer models the processing activities initiated by the 1X cycle of extended-mode execution in the manner described above with respect to two-cycle instruction execution. Activation of cycle__2e signal 455 also causes a 1e state device within a next available timing chain of single-cycle sequencer to set. As was the case during two-cycle instruction execution, this state device is used as a placeholder to record that extended-mode instruction execution is occurring.

When the 2X state device 514 is about to be set within auxiliary sequencer 450, set_auxiliary__2X signal 531 is activated. Auxiliary sequencer 450 provides this signal to combinational logic of all timing chains within extended-mode sequencer 452. In response, the next available one of the extended-mode timing chains N1 560 through N6 564 is activated by setting the 1X state device of this next timing chain. The activated timing chain models processing activities initiated during cycle 2e of the extended-mode instruction, as is represented by waveform M 612 of FIG. 16.

At the start of the next cycle, the next available timing chain will be activated to represent cycle 3e processing. The activation of this timing chain is controlled by activation of a previous timing chain for cycle 2e, as well as the activation of select_CS_control signal 174. In reference to FIG. 5, it may be recalled that this select_CS_control signal is activated at the start of the 2e cycle by instruction decode logic 456, and indicates that extended-mode instruction execution is occurring.

As long as select_CS_control signal 169 remains activated, a next available one of timing chains N1 through N6 will be activated. The setting of a 1X state device during the current cycle causes the setting of the 1X state device in the next available timing chain during the next cycle.

Within a timing chain, the activation of 2X through 6X state devices occurs in a manner similar to that discussed above with respect to single-cycle instruction execution. For example, within chain N1 560, the cycle after 1X state device 574 is activated, this state device will be cleared, and 2X state device 576 will be set. The 2X state device may be cleared by the assertion of late_abort signal 442. Otherwise, if the late_ abort signal 442 is not activated, 3X state device 578 is set and 2X state device 576 is cleared one cycle after the 2X state device is set. The 3X state device 578 may be cleared by the assertion of abort-2back signal 544 in the manner described above.

If abort-2back signal 444 is not activated, 3X state device 578 is cleared and 4X state device 580 is set one cycle after the 3X state device is set. The 4X state device 580 may be cleared by the activation of abort-3back signal 446. If the abort-3back signal is not activated, 5X state device 582 is set the following cycle, and state device 580 is cleared. Finally, on the next cycle, 6X state device 584 is set while 5X state device 582 is cleared.

Use of extended-mode sequencer 452 continues in the manner described above for extended cycles 2e through Ne. Select_CS_control signal 174 clears at the beginning of the Ne cycle of extended-mode execution, as shown in FIG. 5. At this time, no additional timing chains within extended-mode sequencer 452 will be activated, although all previously enabled timing chains will be used to complete modeling of previously-initiated processing activities.

Select_CS_control signal 174 is provided to combinational logic within single-cycle sequencer 448. As previously discussed, a 1e state device within an available one of the P1 460 through P6 464 timing chains was activated by cycle_2e signal 455 at the start of extended-mode execution. When select_CS_control signal clears, this 1e state device is cleared, and the 2X state device within the same timing chain is activated. Also at this time, an activate_Px signal is asserted within single-cycle sequencer 448 to activate a next available one of the timing chains as a next instruction is loaded into F0 register 164*a*.

After the 2X state device within single-cycle sequencer is set for an extended-mode instruction, the remaining state devices within the chain are activated during the following cycles in the manner discussed above. The assertion of any of the various abort signals may be used to clear respective ones of these state devices in the manner previously discussed. In this manner, modeling for an extended-mode instruction is completed.

The foregoing discussion relates to the use of the timing chains within the various sequencers. These timing chains are controlled, in part, by signals generated by abort logic 204, including current_abort 440, late_abort 442, abort_2back 444, and abort_3back 446 signals. These signals are used to clear timing chains within pipeline sequencer 198. Abort logic 204 generates these abort signals when an event such as an error, interrupt, jump, or skip is detected that will change the flow of instructions through the instruction pipeline. To generate the appropriate abort signals, abort logic must also take into consideration the type and number of instructions in the pipeline at a time the event occurs. This information is communicated to abort logic 204 using the state devices of pipeline sequencer 198, which are provided on lines 441, 443, and 445 (FIG. 11). This can best be understood by the following examples.

Figure 17:
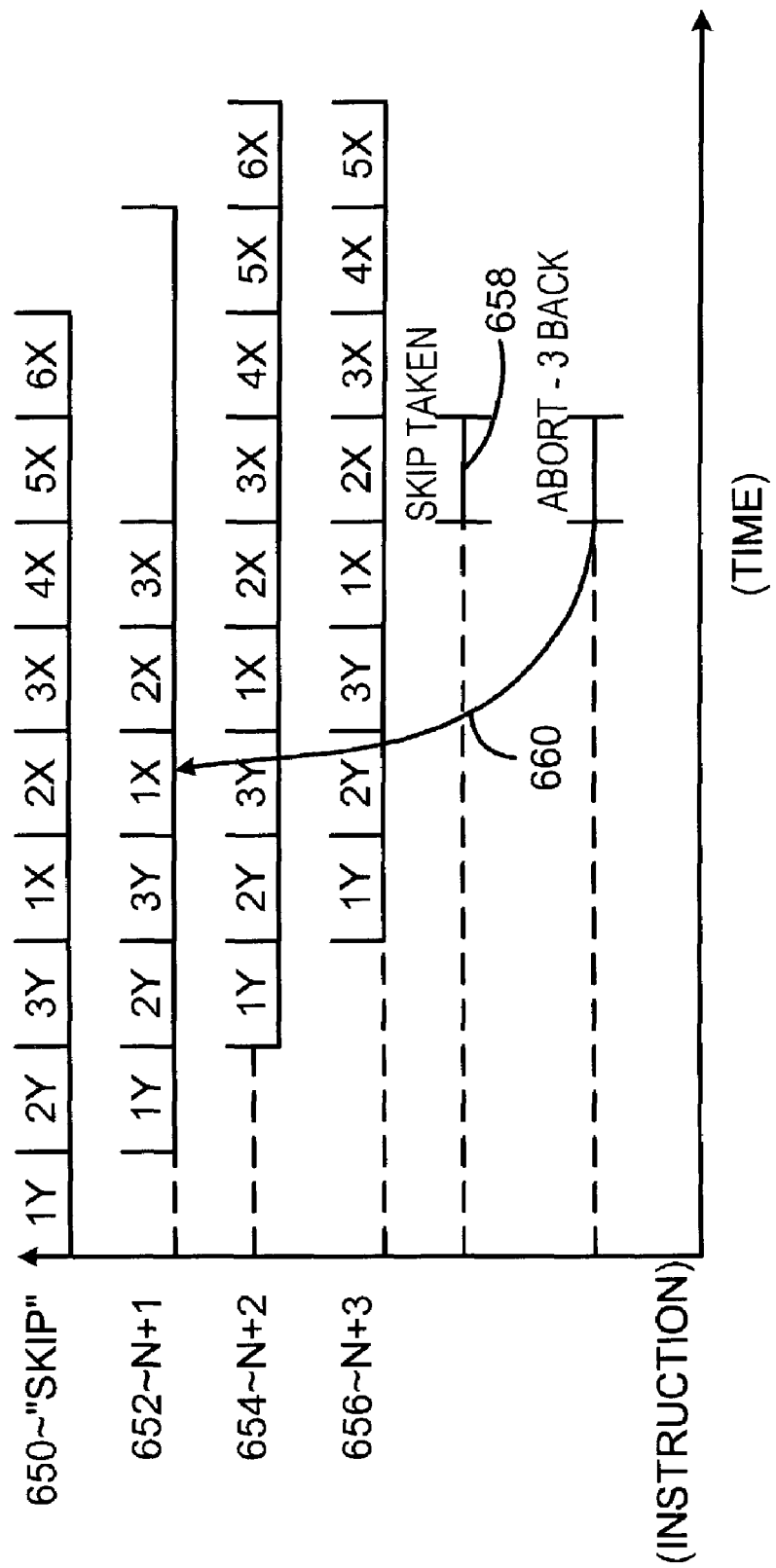
FIG. 17 is a timing diagram illustrating a first example of an abort signal needed to skip a single-cycle instruction.

FIG. 17 is a timing diagram illustrating a first example of an abort signal that is generated by abort logic 204 when an instruction skip is executed. In this example, a conditional "skip" instruction is loaded into F0 register 164*a*, and begins execution, as shown by waveform 650. A skip instruction will cause the next instruction N+1 to be skipped if a predetermined condition is detected within the IP. This condition could be a flag such as an "equal" indicator being set by arithmetic logic 194. This condition will not be available for detection until the 5X cycle of the skip instruction.

Prior to the 5X cycle of the skip instruction, instruction N+1 is loaded into F0 register 164*a* and begins instruction execution. For this example, instruction N+1 is a single-cycle instruction, as indicated by waveform 652. Other instructions also enter the pipeline during the following cycles, including single-cycle instructions N+2 and N+3, shown by waveforms 654 and 656, respectively.

When the 5X cycle of skip instruction execution commences in the current example, arithmetic section 194 generates a skip_taken signal shown as waveform 658. This signal indicates that the predetermined condition did, in fact, occur, and instruction N+1 is to be skipped. Therefore, all processing activities initiated by instruction N+1 are to be voided within all logic sections of the pipeline.

When abort logic 204 receives the skip_taken signal, combinational logic included within abort logic uses this signal in conjunction with the output from all state devices of pipeline sequencer to determine which one or more abort signals to issue. In this example, combinational logic uses the various state devices to determine that instruction N+1 is a single-cycle instruction. This is determined by detecting that a 4X state device has set within any one of the single-cycle timing chains.

If it is determined that N+1 is a single-cycle instruction, as is the case in the current example, all processing activities that were initiated during cycle 1X of instruction N+1 execution must be terminated. Because the 1X cycle of N+1 instruction execution occurred three cycles ago, abort logic 204 generates an abort_3back signal 446.

When the abort_3back signal 446 is provided to single-cycle sequencer 448, it will clear the 4X state device within the timing chain representing execution of instruction N+1. This represents the voiding of all processing activities for instruction N+1, as indicated by arrow 660. The clearing of the 4X state device within single-cycle sequencer 448 will clear both single-cycle_enable signal 457 and 4W_enable 461 (FIG. 11) during what would have been the 4X cycle of instruction N+1.

The 4W_enable signal 461 is provided to the various logic sections of the IP. This signal is latched within the various logic sections some time after the start of a cycle. It may thereafter be employed to enable the use of staged processing results. Specifically, when the 4W_enable signal remains inactive for a cycle as may occur because of the generation of an abort signal in the manner discussed above, certain staged processing activities are discarded. This effectively voids the processing activities for a given instruction. The use of 4W_enable signal 461 in this manner greatly simplifies pipeline control in a manner to be discussed further below.

Returning to a discussion of abort logic 204, several additional examples may be provided to further illustrate its operation.

Figure 18:
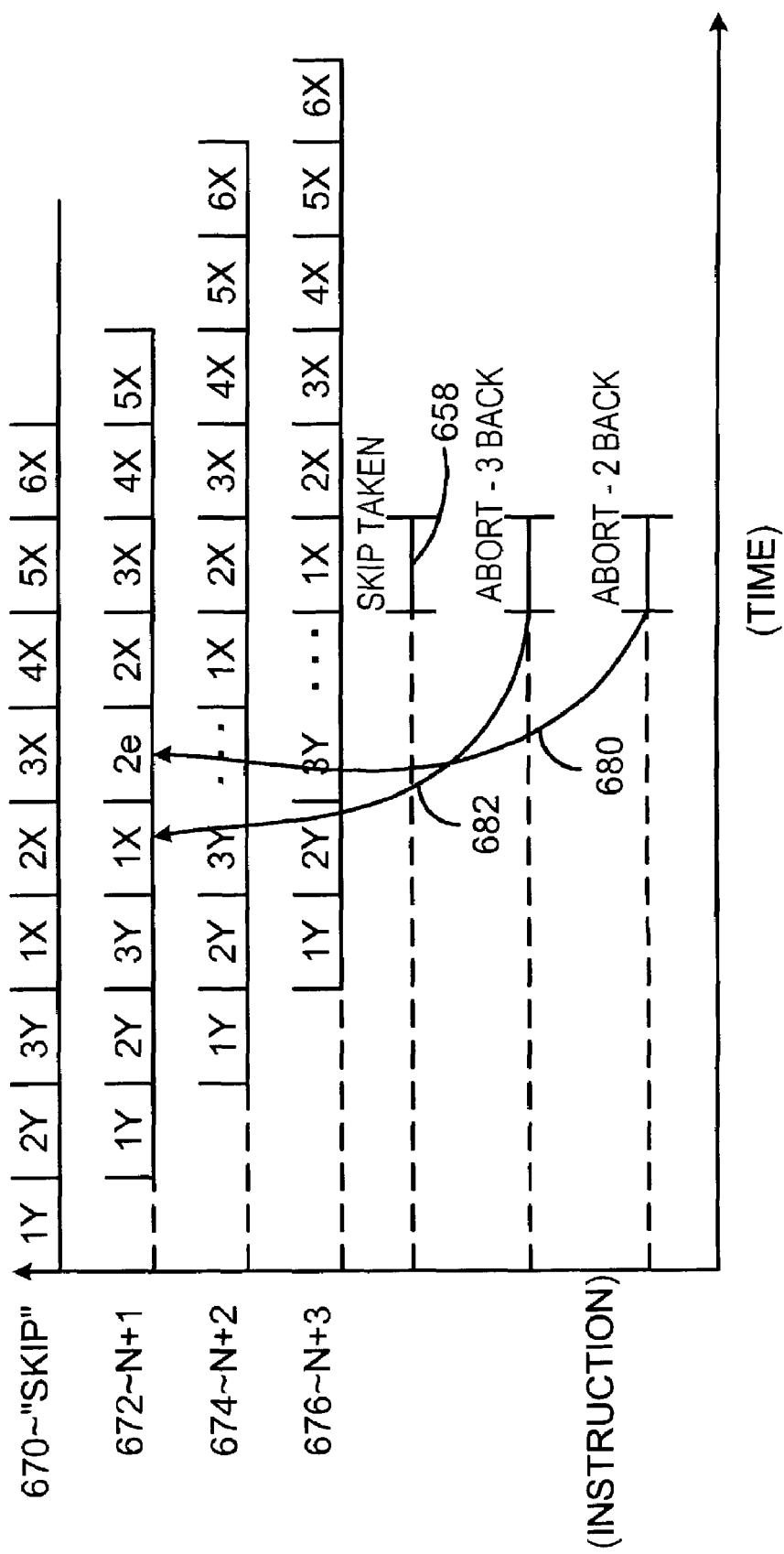
FIG. 18 is a timing diagram illustrating the generation of abort signals needed to skip a two-cycle instruction.

FIG. 18 is a timing diagram illustrating the generation of abort signals needed to skip a two-cycle instruction. A "skip" instruction is loaded into F0 register 164*a*, and begins execution, as shown by waveform 670. During the next cycle, a two-cycle instruction N+1 is loaded into F0 register 164*a* and begins instruction execution, as indicated by waveform 672. Additional single-cycle instructions N+2 and N+3 enter the pipeline during the following cycles, as shown by waveforms 674 and 676, respectively.

The skip_taken signal 568 is activated during cycle 5X of the skip instruction. Abort logic uses this signal and the states of pipeline sequencer 198 to determine that instruction N+1 is a two-cycle instruction. This could be determined, for example, by detecting that the 4X state device 520 is set within auxiliary sequencer 450, a 3X state device is set within extended-mode sequencer 452, and no 2X state device is also set within extended-mode sequencer. Because instruction N+1 is a two-cycle instruction, processing activities that were initiated three cycles ago, as well as those initiated two cycles ago, must be terminated. Therefore, abort logic 204 generates an abort_2back signal 444 to nullify the processing activities initiated during the 2e cycle, as shown by arrow 680. Abort logic further generations an abort_3back signal 446 to nullify the processing activities initiated during the 1X cycle, as shown by arrow 682.

When abort_3back signal 446 is provided to pipeline sequencer 198, 4X state device 520 is cleared within auxiliary sequencer 450. This represents the voiding of processing activities initiated during cycle 1X execution of instruction N+1. The clearing of this state device causes the de-activation of auxiliary_enable signal 458 during what would have been the 4X cycle of instruction N+1.

The abort_2back signal 444 is also provided to pipeline sequencer to clear all 3X state devices within extended-mode sequencer 452. This will clear the state device that represents processing activities initiated during cycle 2*e* of instruction N+1, and will, in turn, result in de-activation of extended-mode_enable signal 459 during what would have been the 3X cycle of instruction N+1.

The de-activation of the auxiliary_enable signal 458 and extended-mode_enable signal 459 will result in de-activation of 4W_enable signal 461 during what would have been the 3X and 4X cycles of instruction N+1. This causes all staged processing results for instruction N+1 to be discarded within the various IP logic sections in a manner to be discussed below, effectively nullifying the execution for instruction N+1.

Figure 19:
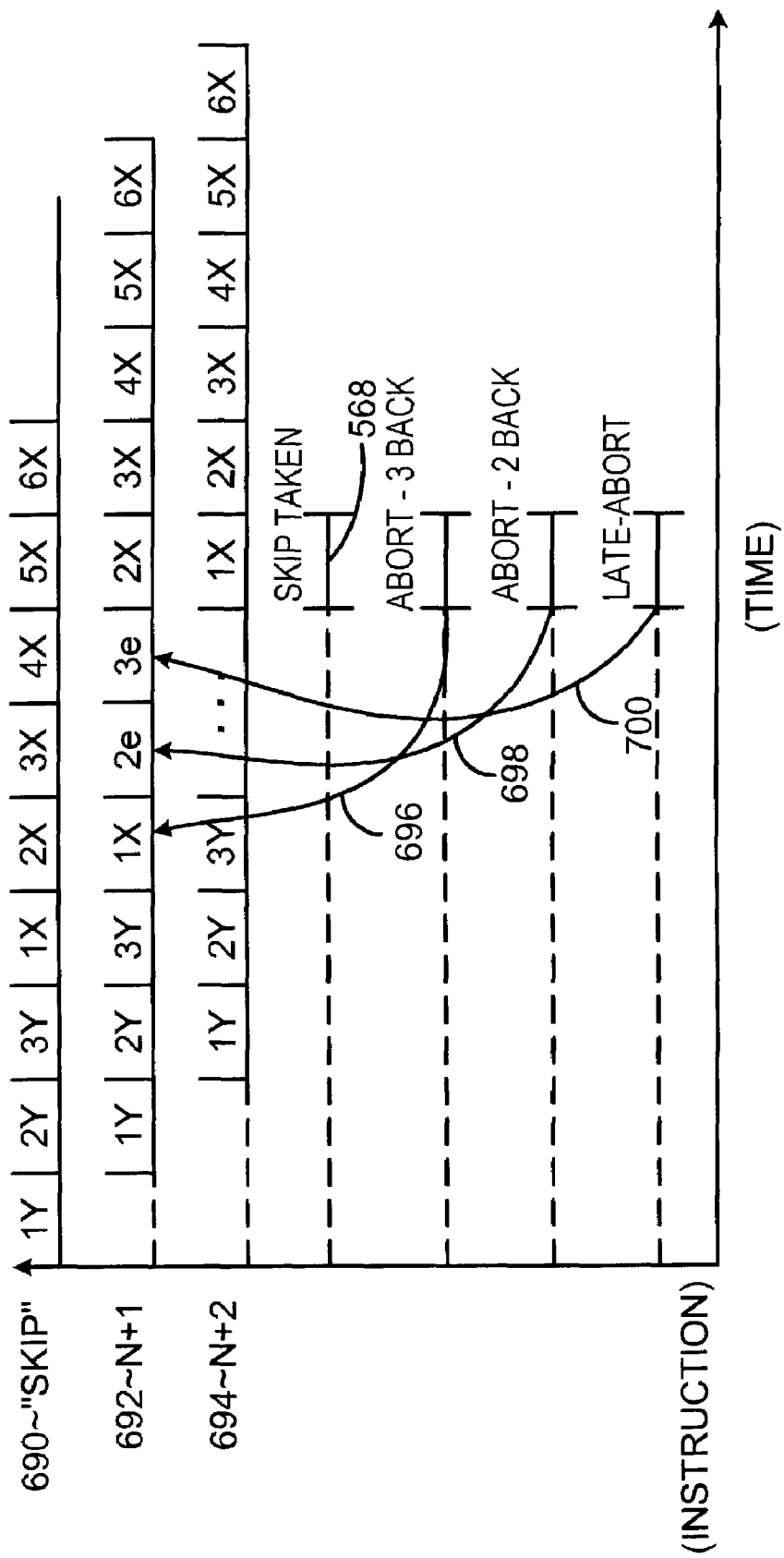
FIG. 19 is a timing diagram illustrating the generation of abort signals needed to skip an extended-mode instruction.

FIG. 19 is a timing diagram illustrating the generation of abort signals needed to skip an extended-mode instruction. A "skip" instruction is loaded into F0 register 164a, and begins execution, as shown by waveform 690. During the next cycle, an extended-mode instruction N+1 is loaded into F0 register 164a and begins instruction execution, as indicated by waveform 692. An additional single-cycle instruction N+2 694 enters the pipeline during the following cycles, as shown by waveform 674.

The skip_taken signal 568 activates during cycle 5X of the skip instruction. Abort logic uses this signal and the states of pipeline sequencer 198 to determine that instruction N+1 is an extended-cycle instruction. As such, processing activities were initiated during the 1X cycle that occurred three cycles ago, and also during the 2e and 3e cycles occurring two and one cycles ago, respectively. Therefore, abort logic 204 generates an abort_3back signal 446 to nullify the processing activities initiated during the 1X cycle, as shown by arrow 696. This signal is used to clear 4X state device 520 of auxiliary sequencer. An abort_2back signal 444 and a late_abort signal 442 are issued to nullify the processing activities initiated during the 2e cycle and 3e cycle, respectively. This is shown by arrows 698 and 700, respectively. The generation of these signals clears a 3X and 2X state device within two timing chains of extended-mode sequencer 452 in a manner similar to that discussed above. This ultimately results in the de-activation of 4W_enable 461 during the three consecutive cycles that would have been occupied by cycles 2X, 3X, and 4X of instruction N+1.

Figure 20:
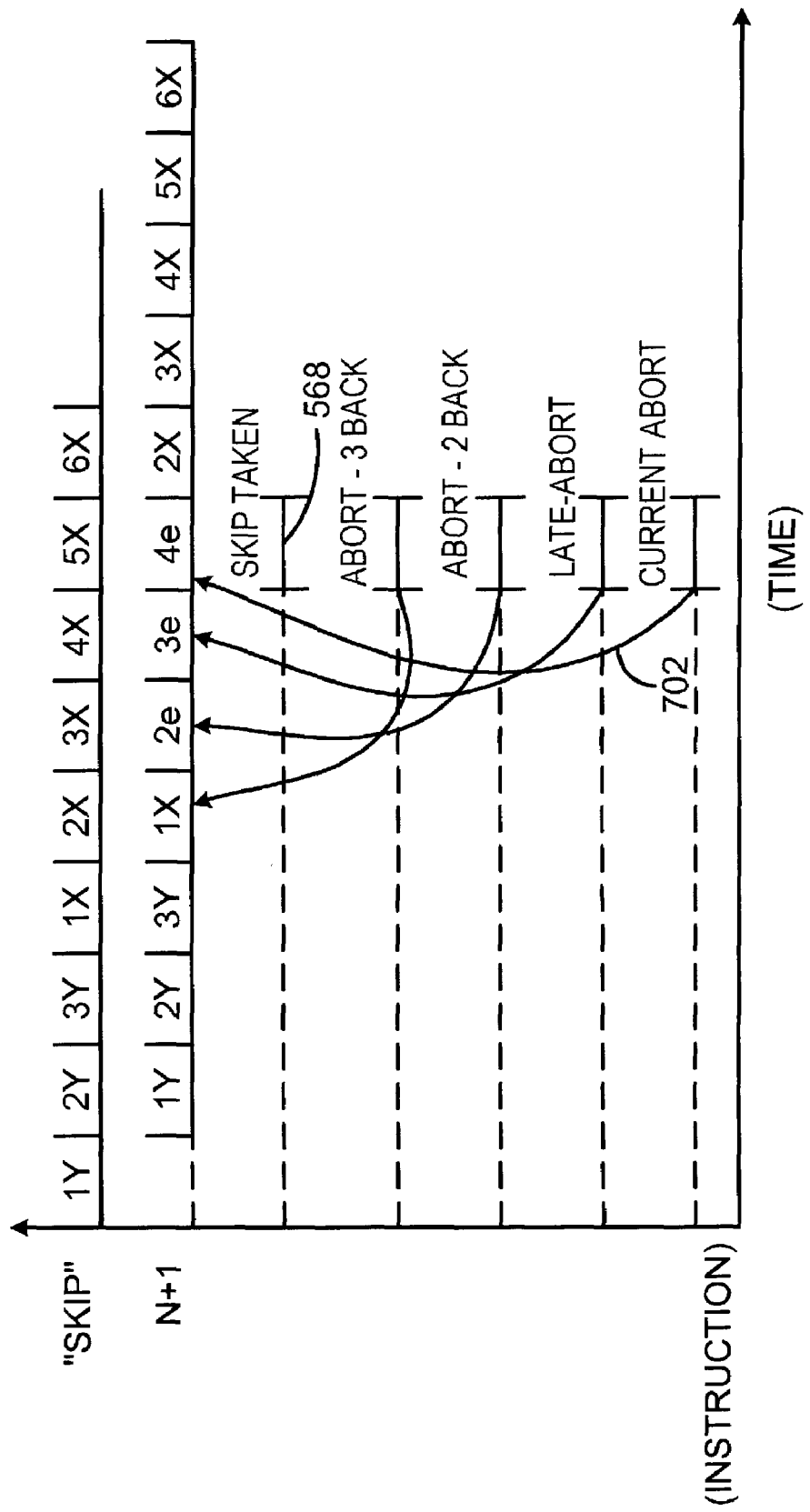
FIG. 20 is a timing diagram illustrating the generation of abort signals needed to skip an extended-mode instruction having an additional extended cycle.

FIG. 20 is a timing diagram illustrating the generation of abort signals needed to skip an extended-mode instruction having an additional cycle. This timing diagram is very similar to that shown for FIG. 19. However, in this case, the extended-mode instruction includes a 4e cycle, necessitating the need for the assertion of current_abort signal 440, as shown by arrow 702.

Figure 21:
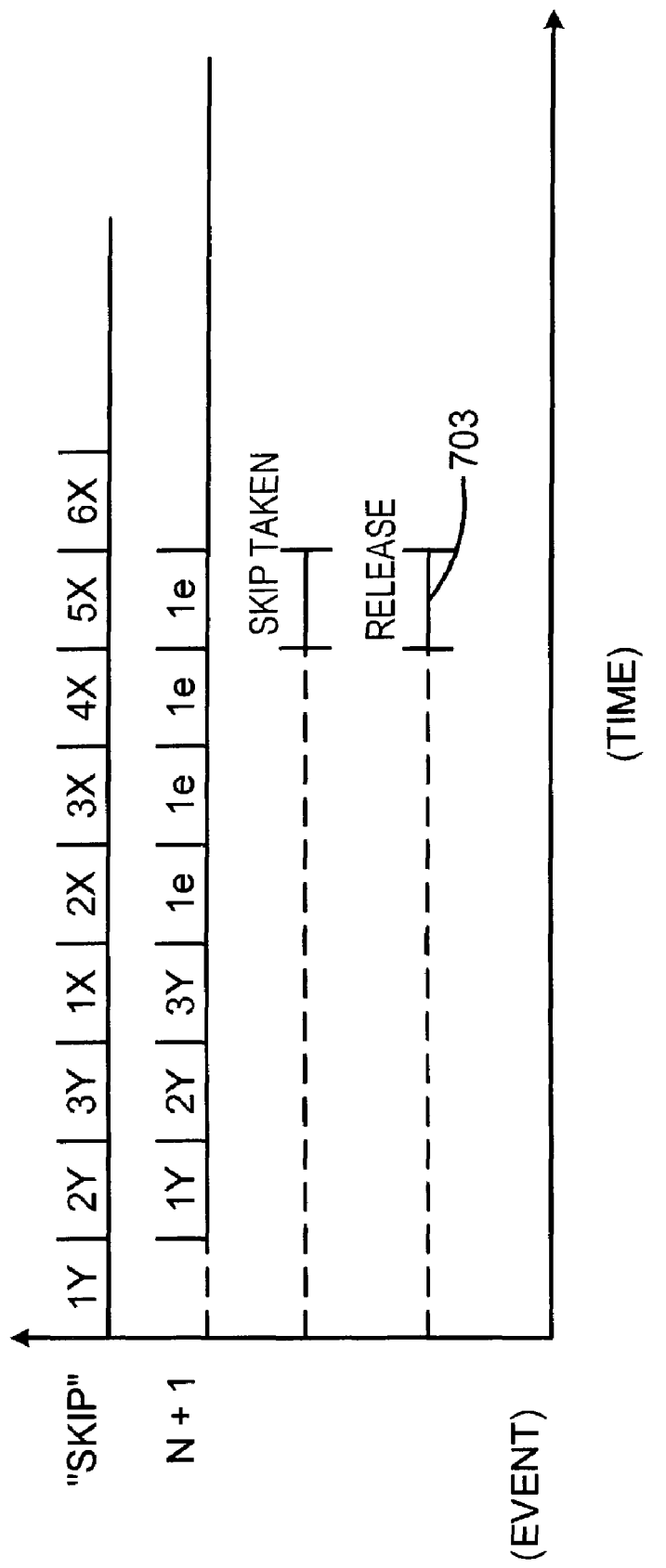
FIG. 21 is a timing diagram illustrating the generation of abort signals when a skip instruction is followed by an instruction that was not resident within the Instruction First-Level Cache (I-FLC).

FIG. 21 is a timing diagram illustrating the generation of abort signals when a skip instruction is followed by an instruction that was not resident within I-FLC 30. As a result, a series a 1e cycles occur for instruction N+1. When skip_taken 568 is asserted, abort logic 204 uses the states of 1e and 1X state devices of pipeline sequencer 198 to detect the cache miss situation, and in response, generates release signal 447 (FIG. 11). This signal, which is shown as waveform 703, causes combinational logic within single-cycle pipeline sequencer and/or two-cycle pipeline sequencer to clear whatever 1e state devices are being used to model instruction execution for instruction N+1. This signal also causes the next instruction to be loaded into F0 register 164a at the start of the next cycle.

The foregoing discussion describes the manner in which combinational logic within abort logic 204 handles a conditional skip instruction for some of the possible scenarios that may exist within the pipeline. The combinational logic operates in a similar manner to handle the other types of pipeline events that may occur. For example, when a jump instruction is loaded into the pipeline, the jump target address becomes available during 3X cycle of the jump instruction. When this target address is available, abort logic receives a jump indication. At this time, all processing activities initiated for instructions following the jump instruction must be voided. Abort logic 204 uses the state devices included in pipeline sequencer 198 to determine which types of instructions are resident within the pipeline, and which types of abort signals must therefore by generated. The abort signals are used to clear the associated timing chains.

In a similar manner, when an interrupt occurs, an interrupt signal is provided to abort logic 204, which generates abort signals to clear timing chains representing all processing activities initiated after the time the interrupt was taken. Various error conditions and conflict situations can also be handled in a similar manner. Abort signals are generated to void the processing activities occurring within the cycles affected by the error and conflict events.

The foregoing discussed described in detail the operation of abort logic 204 and pipeline sequencer 198 according to one embodiment of the invention. Next, the use of pipeline sequencer 198 in controlling the various logic sections of the IP is considered in more detail.

C. Using the Pipeline Sequencer of the Current Invention to Control the IP Pipeline As described above, in prior art systems, each logic section in the IP is responsible for tracking all cycles of instruction execution for all of the various types of instructions that are resident within the pipeline at a given time. Each logic section is further responsible for detecting any of the types of occurrences that may necessitate terminating processing activities, including various types of error conditions, conflicts, jumps, skips, and interrupts. In many prior art systems, these various types of error conditions are provided directly to each logic section in the system for processing. In other prior art systems such as the CS 7802 commercially available from Unisys Corporation, some abort logic is provided within the processors to process some of the event signals. This logic generates various abort signals that may be used by other logic sections to perform pipeline control. However, even in the case of these latter types of systems, the logic for processing the errors and other events is not comprehensive. That is, this logic does not take into account all of the errors, conflicts, jumps, skips, and interrupts that may occur within the system. Some of these events such as jumps and skips must still detected and processed by the individual logic sections.

Prior art systems also require each logic section to implement a way to void processing activities after a particular system event such as an error, interrupt, jump or a skip is detected. This involves using the state of the system as tracked within that logic section to determine which processing activities to nullify. In short, each logic section must track all pipeline activity and the various events that affect that activity, then take appropriate actions, as needed, to nullify previously initiated activity within that logic section. Using this prior art methodology, pipeline control is dispersed throughout the system, and is implemented in a non-uniform manner. This is true since, for each logic section, a logic designer responsible for that section devises a way to implement the pipeline control mechanism without regard to how that control is implemented within another logic section. This results in the duplication of design effort, greatly increases the amount of circuitry needed to implement the machine, and significantly increases the amount of time to design and debug the system.

The current invention eliminates the need for each logic section to track pipeline activities. Instead, pipeline sequencer 198 models all possible pipeline states that may exist as instructions move through the IP pipeline. As processing activities are initiated within the pipeline, timing chains are activated within the sequencer to model these activities. Similarly, as various occurrences arise with the IP, requiring the termination of associated processing activities within the pipeline, one or more timing chains associated with those activities are de-activated. Moreover, all system events that may potentially result in the termination of some processing activity are accounted for by abort logic 204 and pipeline sequencer 198. This includes all error, interrupt, conflict, skip and jump occurrences. As a result, the various logic sections within the IP need not track pipeline states, or the various event occurrences that may affect these states, since this tracking is performed entirely by abort logic 204 and pipeline sequencer 198.

According to the current invention, pipeline sequencer 198 generates at least one enable signal, shown as 4W_enable 461, that is provided to the rest of the machine along with signals on lines 182, as discussed above. This enable signal indicates to all logic sections that certain processing activities may be considered permanent. More specifically, if this enable system is activated during a given cycle, it indicates that no event occurred that would require the nullification of the processing activities that are associated with that signal occurrence for that particular cycle.

Each logic section may stage processing results in temporary storage devices. When 4W_enable signal 461 is received, predetermined temporarily stored processing results may then be considered as "permanent". That is, the results can be used to affect the pipeline since it is known that these results will not need to be discarded. Pipeline control is thereby greatly simplified. This can best be understood by considering an exemplary operation involving the O-FLC 28.

Figure 22:
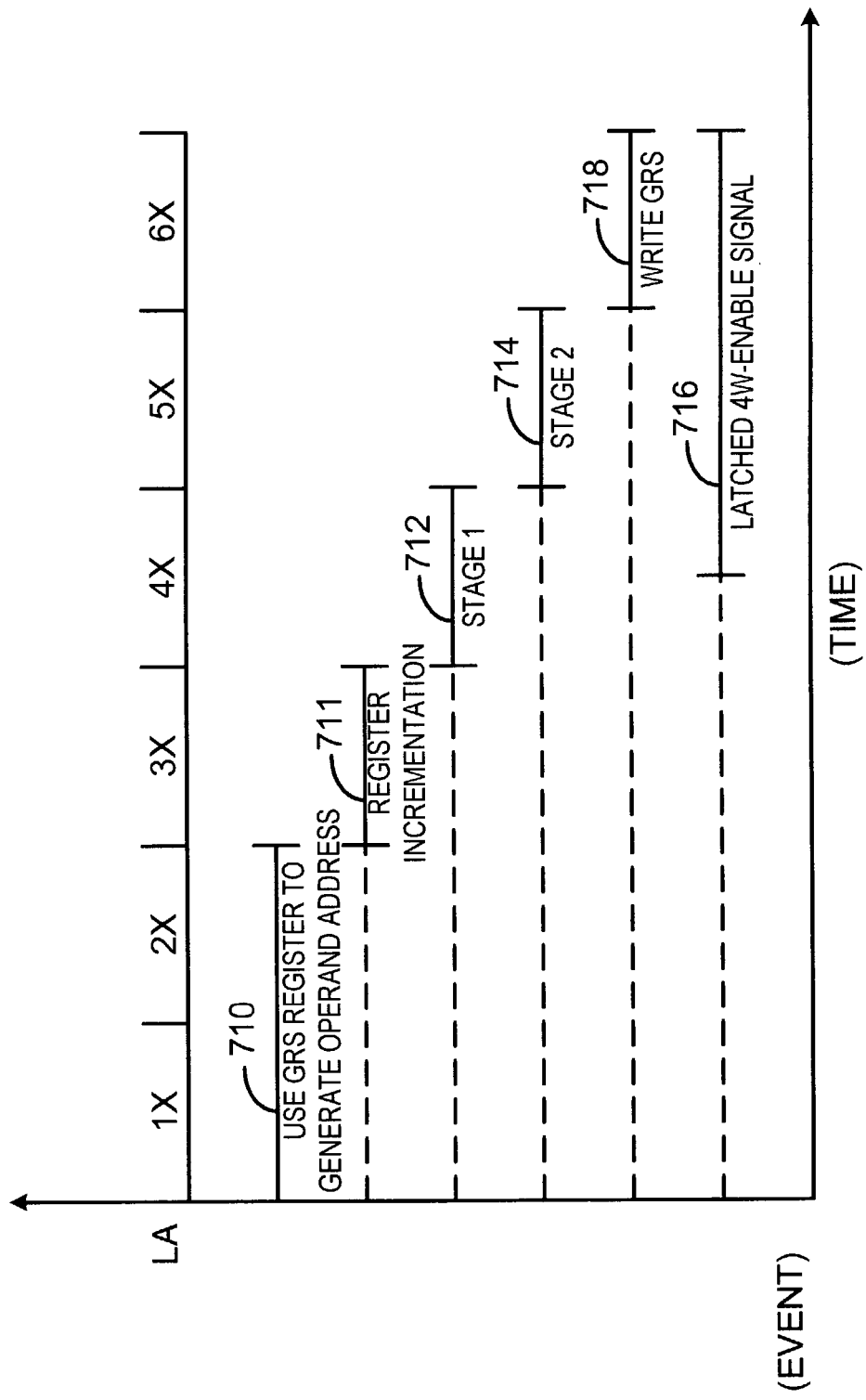
FIG. 22 is a timing diagram illustrating execution of a Load_A (LA) instruction within an IP pipeline employing the current invention.

FIG. 22 is a timing diagram illustrating execution of a "Load A", or "LA" instruction. This instruction generates an address within O-FLC 28 using address information stored within GRS 28a. This address is used to retrieve an operand, which may also be stored within GRS 28a. Additionally, address information within GRS 28a is updated for use in future instruction execution. This timing of these operations is as follows. During the 1X and 2X cycles, the contents of an addressed one of the registers included within GRA 28a is provided via lines 184 to operand address generate logic 180. Also during this time, the contents of an addressed one of the base registers are provided by addressing environment 190 to operand address generate logic 180 on lines 182. This information is used by operand address generate logic 180 to generate an operand address for retrieving data from O-FLC, as is indicated by waveform 710.

During the next cycle 3X, the contents of the GRS register that were used during the previous two cycles may be incremented, as shown by waveform 711. The updated register contents are provided to GRS 28a via lines 184. This data is stored within first and second staging registers during 4X and 5X cycles, as shown by waveforms 712 and 714, respectively.

Sometime during the 4X cycle, 4W_enable signal 461 becomes valid and is latched for this instruction, as illustrated by waveform 716. As discussed in detail above, pipeline sequencer generates this signal using the various timing chains that model instruction execution. During every cycle, 4W_enable is used to determine whether processing activity associated with that cycle is to be used or discarded. In the current example, during 4X cycle of instruction LA, the 4W_enable signal may be activated by a timing chain within pipeline sequencer 198 that is used to model the LA instruction execution. The timing chain will activate 4W_enable 461 during the 4X cycle of LA instruction execution if no other event such as a skip or jump occurred that would require termination of the this instruction.

Activation of the 4W_enable is used by logic within O-FLC 28 to store the staged register contents to GRS 28a, thereby permanently affecting pipeline execution. This is illustrated by waveform 718. If 4W_enable 461 is not activated during 4X cycle of the LA instruction, the updated register contents that were staged during cycles 4X and 5X are discarded. In this manner, O-FLC need not track the type of instructions or events occurring within the pipeline. The single 4W_enable signal 461 may be used to facilitate all control needed to by O-FLC to comply with pipeline requirements. Moreover, O-FLC need not implement complicated logic to "back-out" results that were previously used to affect the pipeline, but which now must be voided.

Figure 23:
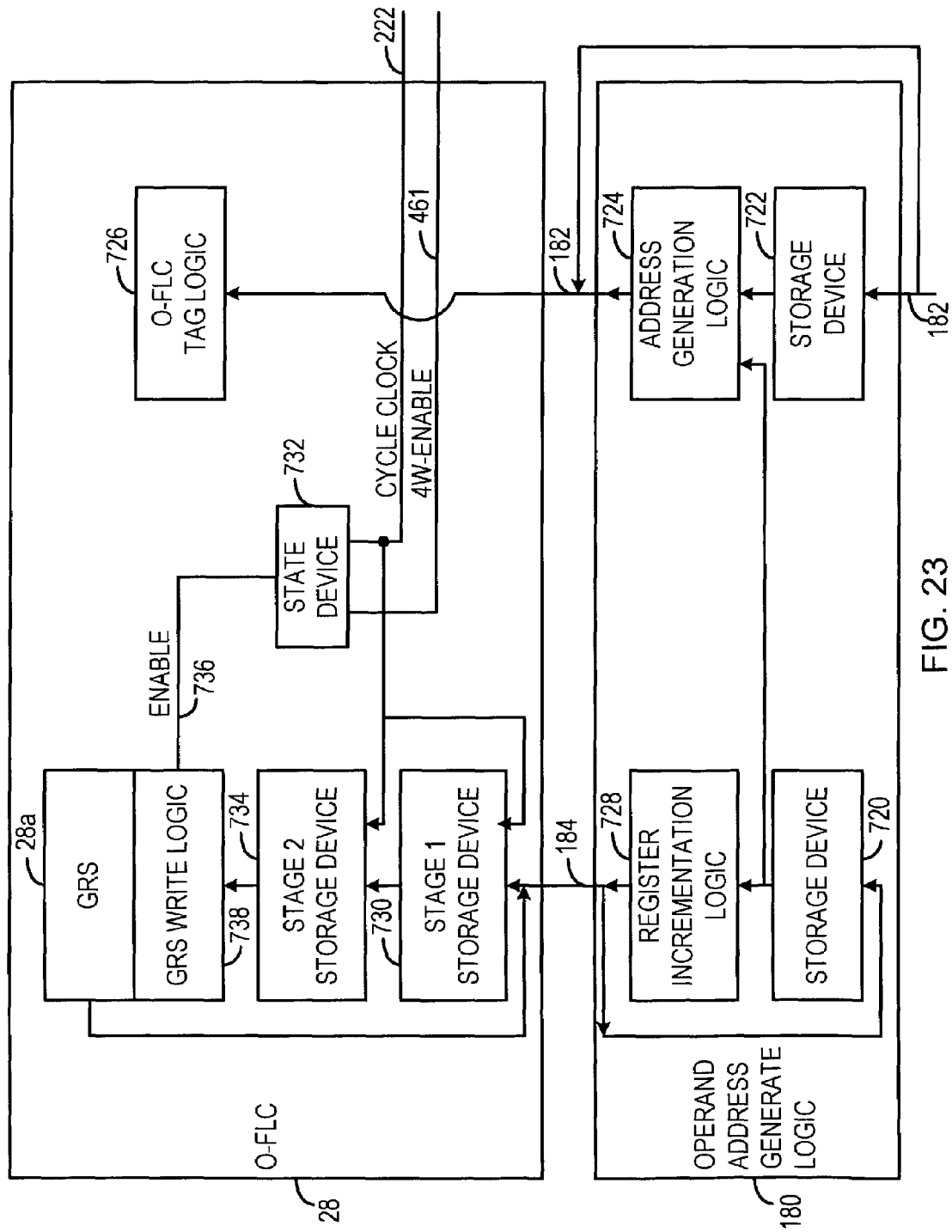
FIG. 23 is a block diagram illustrating exemplary staging logic as may be used to complete the Load_A instruction described in FIG. 22.

FIG. 23 is a block diagram illustrating exemplary staging logic as may be used to complete the "Load A" instruction described in FIG. 22. As discussed above, during 1X cycle of the instruction, the contents of an addressed register are provided from GRA 28a via interface 184 to storage device 720 of operand address generate logic 180. Also during this time, addressing environment 190 provides the contents of an identified one of the base registers on interface 182 to storage device 722. These signals are used by address generation logic 724 to generate an address that is provided to O-FLC tag logic 726 via interface 182. The contents of the GRS register within storage device 720 may be incremented by register incrementation logic 728 depending on the LA instruction. These signals are provided to stage 1 storage device 730 within O_FLC 28 via interface 184. These contents will be stored in stage 1 storage device 730 at the start of 4X cycle for the LA instruction.

During the 4X cycle, signal 4W_enable 461 is activated for this instruction if no event occurred that would require nullification of the associated instruction. The activated signal is latched by cycle clock signal 222 into state device 732 at the start of 5X cycle for the LA instruction. In another embodiment, this signal could be latched by a different clock signal such that it is captured between the start and end of 4X cycle. Also at the start of 5X cycle, the signals stored in stage 1 storage device 730 are transferred to stage 2 storage device 734. If the enable signal on line 736 is activated, indicating the 4W_enable 461 is activated for this instruction, GRS write logic 738 stores the contents of stage 2 storage device 734 to GRS 28a, completing the operation with respect to the GRS registers.

From the foregoing example, it will be appreciated that the 4W_enable signal 461 may be used in a similar manner to control all logic sections within the IP. That is, any logic section may include logic to temporarily store processing results. These processing results may be considered available for use during future processing activities if the 4W_enable signal becomes active.

It may be noted that the 4W_enable signal is a relatively arbitrary choice for use in controlling the staging activity. This signal was selected because it takes into account all abort signals that may affect the processing activities of a given instruction. Other similar enable signals such as a 5W_enable or 6W_enable may be generated by combining the outputs of all 5X or 6X state devices within the sequencer, respectively. These signals may be used by the logic sections in addition to, or instead of, the 4W_enable signal, although in these instances, additional staging logic may be needed. It may further be appreciated that other enable signals such as a 3W_enable may be generated. Of course, such a signal must only be used to enable the use of processing results that will not be affected by the abort-3back signal, as is evident from the foregoing discussion.

The above-described mechanism for unifying and simplifying pipeline control can be applied to a pipeline having virtually any depth. This can be accomplished by providing additional timing chains, each of a length that accommodates the increased pipeline depth. In this case, additional abort signals may be generated, such as an abort_4back to nullify processing activity initiated four cycles ago, or an abort_5back to void processing activity initiated five cycles ago. Again, these concepts may be extended virtually indefinitely as required by the pipeline depth, and the various occurrences that may arise within the system. These signals could be generated by abort logic 204 in a manner that is similar to that discussed above with respect to the other abort signals. Furthermore, any of the stages of the timing chains within pipeline sequencer may be used to generate enable signals as needed by the staging logic. Additional event signals may be provided to abort logic for use in generating the various abort signals. Moreover, other embodiments may include additional instruction types that may necessitate the modification of an existing sequencer, or the addition of one or more sequencers and/or timing chains, all within the scope of the current invention. Thus, it will be understood that the above-described systems and methods are exemplary, and the embodiments of the invention herein described are merely illustrative of the principles of the invention. These embodiments are therefore not intended to limit the scope of the claims, which themselves recite those features regarded as essential to the invention.

What is claimed is:

1. A pipelined Instruction Processor (IP) to execute instructions, comprising:
   multiple logic sections, each to perform a respective processing activity during instruction execution; and
   a state machine coupled to each of the logic sections to model the processing activities within the multiple logic sections, and to thereby determine whether signals generated during predetermined ones of the processing activities must be discarded or may instead be used by one or more of the logic sections to continue instruction execution.

2. The IP of claim 1, wherein the IP is capable of executing up to a predetermined number of instructions at once, and wherein the state machine includes circuits to model the processing activities initiated by each of the predetermined number of instructions.

3. The IP of claim 2, wherein the state machine includes a logic sequencer.

4. The IP of claim 3, wherein the logic sequencer includes multiple timing chains, each to model at least a portion of the processing activities initiated within the multiple logic sections during execution of a respective one of the machine instructions.

5. The IP of claim 3, further including abort logic coupled to receive signals indicative of one or more conditions affecting the processing activities, the abort logic further being coupled to after one or more states within the logic sequencer if any of the one or more of the conditions are detected.

6. The IP of claim 5, wherein the conditions are selected from the group consisting of jumps, errors, skips, interrupts, and conflicts.

7. The IP of claim 5, wherein the abort logic includes circuits to alter one or more states within the logic sequencer based on current states within the logic sequencer.

8. The IP of claim 7, wherein the logic sequencer includes an enable generation circuit to indicate, based on one or more states within the logic sequencer, whether the signals generated during predetermined ones of the processing activities must be discarded.

9. The IP of claim 8, wherein at least one of the multiple logic sections includes:

staging circuits to temporarily store the signals generating during predetermined ones of the processing activities; and circuits to receive those ones of the temporarily stored signals that will be used to control future ones of the processing activities based on an indication provided by the enable generation circuit.

10. The IP of claim 7, wherein the IP is capable of executing multiple types of machine instructions, and wherein the logic sequencer includes circuits to model each of the multiple types of machine instructions.

11. The IP of claim 10, wherein at least one of the multiple types of machine instructions includes extended-mode instructions that operate under microcode control, and wherein the logic sequencer includes circuits to model the microcode control.

12. The IP of claim 4, wherein each instruction may be executed during multiple execution cycles, and wherein one or more of the timing chains include multiple state devices, each to model a respective execution cycle for a respective one of the machine instructions.

13. A method for controlling execution of instructions within a pipeline of an instruction processor (IP), comprising:
   a.) employing a state machine to model execution of an instruction as it is processed within the pipeline;
   b.) detecting an event that affects the execution of the instruction, and in response thereto, updating execution modeling; and
   c.) using the execution modeling to determine whether the execution of the instruction will be allowed to affect the pipeline.

14. The method of claim 13, and wherein step a.) models the concurrent execution of multiple instructions within the pipeline.

15. The method of claim 14, wherein up to a predetermined number of instructions may be executing within the pipeline at once, and wherein step a.) is capable of modeling at least the predetermined number of instructions.

16. The method of claim 15, and further including repeating steps a.) through c.) for each instruction that enters the pipeline.

17. The method of claim 16, wherein step a.) comprises using the state machine to model the concurrent execution of multiple instructions within the pipeline.

18. The method of claim 17, wherein the state machine includes multiple timing chains, and further including modeling each instruction with one or more respective ones of the liming chains.

19. The method of claim 18, wherein each of the timing chains includes multiple state devices, wherein execution of each instruction may be divided into cycles, and further including, modeling each cycle of an instruction using at least one state device within the one or more respective ones of the timing chains.

20. The method of claim 16, and further including modeling multiple types of instructions.

21. The method of claim 16, wherein step b.) includes detecting events from the group consisting of jumps, skips, errors, conflicts, and interrupts.

22. The method of claim 17, wherein step b.) includes modifying one or more states within the state machine if an event that affects the execution of one of the multiple instructions is detected.

23. The method of claim 22, and further including determining which of the states within the state machine to modify based on the existing states of the state machine.

\* \* \* \* \*